United States Patent
Sharon et al.

(10) Patent No.: US 11,068,165 B2
(45) Date of Patent: Jul. 20, 2021

(54) NON-VOLATILE MEMORY DATA WRITE MANAGEMENT

(71) Applicant: Western Digital Technologies, Inc., San Jose, CA (US)

(72) Inventors: Eran Sharon, Rishon Lezion (IL); Shay Benisty, Beer Sheva (IL); Ariel Navon, Revava (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/454,885

(22) Filed: Jun. 27, 2019

(65) Prior Publication Data
US 2020/0409559 A1     Dec. 31, 2020

(51) Int. Cl.
*G06F 12/02*     (2006.01)
*G06F 3/06*      (2006.01)

(52) U.S. Cl.
CPC .......... *G06F 3/0608* (2013.01); *G06F 3/064* (2013.01); *G06F 3/0673* (2013.01); *G06F 12/0246* (2013.01)

(58) Field of Classification Search
CPC .......... G06F 3/06; G06F 12/02; G06F 3/0608; G06F 3/064; G06F 3/0673; G06F 12/0246
USPC ........................................................ 711/154
See application file for complete search history.

(56) References Cited

U.S. PATENT DOCUMENTS

| | | |
|---|---|---|
| 8,312,046 B1 | 11/2012 | Eisler et al. |
| 8,635,399 B2 | 1/2014 | Lee et al. |
| 9,208,071 B2 | 12/2015 | Talagala et al. |
| 9,466,383 B2 | 10/2016 | Peng et al. |
| 9,696,935 B2 | 7/2017 | Hashimoto et al. |
| 9,830,079 B2 | 11/2017 | Kanno |
| 9,977,734 B2 * | 5/2018 | Kanno ............. G06F 12/0246 |
| 10,102,118 B2 * | 10/2018 | Kanno ............. G06F 12/0246 |
| 10,120,606 B2 | 11/2018 | Kim et al. |
| 10,268,584 B2 | 4/2019 | Hahn |
| 2003/0072178 A1 | 4/2003 | Keays |
| 2003/0072180 A1 | 4/2003 | Keays |
| 2003/0101434 A1 | 5/2003 | Szyperski |
| 2005/0273551 A1 | 12/2005 | Keays |
| 2006/0212647 A1 | 9/2006 | Takai |

(Continued)

OTHER PUBLICATIONS

Jumping on the Demand for NVMe 1.3 Streams, Posted by VIP Experts, (https://blogs.synopsys.com/vip-central/author/vipexpert/) on Dec. 19, 2017, See particularly first three paragraphs.

(Continued)

*Primary Examiner* — Christopher B Shin
(74) *Attorney, Agent, or Firm* — Patterson & Sheridan, LLP; Steven H. Versteeg

(57) ABSTRACT

An open block management apparatus, system, and method for non-volatile memory devices is disclosed herein, providing improved performance for namespace-based host applications. The namespace identifier is applied to determine the open blocks to which to direct data from storage commands. One benefit of the disclosed technique is fewer de-fragmentation operations and more efficient memory garbage collection. Another benefit is the ability to secure private allocations of physical memory without needing to assign a partition or implement hardware isolation.

20 Claims, 15 Drawing Sheets

(56) References Cited

U.S. PATENT DOCUMENTS

| | | |
|---|---|---|
| 2009/0007162 A1 | 1/2009 | Sheehan |
| 2010/0191779 A1* | 7/2010 | Hinrichs ............... G06F 3/0689 |
| | | 707/822 |
| 2011/0106802 A1 | 5/2011 | Pinkney et al. |
| 2012/0109899 A1 | 5/2012 | Wahlert et al. |
| 2012/0179683 A1 | 7/2012 | Balassanian |
| 2014/0195480 A1 | 7/2014 | Talagala et al. |
| 2014/0195564 A1 | 7/2014 | Talagala et al. |
| 2016/0070652 A1 | 3/2016 | Sundararaman et al. |
| 2017/0024137 A1* | 1/2017 | Kanno ................. G06F 3/0644 |
| 2017/0262176 A1* | 9/2017 | Kanno ................. G06F 3/0647 |
| 2017/0262365 A1* | 9/2017 | Kanno ................. G06F 3/0619 |
| 2018/0225065 A1* | 8/2018 | Singh ................. G06F 13/4226 |
| 2018/0307521 A1* | 10/2018 | Pinto ..................... G06F 12/109 |
| 2018/0341579 A1 | 11/2018 | Miao |
| 2018/0341606 A1* | 11/2018 | Bolkhovitin ............ G06F 3/067 |
| 2019/0227921 A1* | 7/2019 | Frolikov ................ G06F 3/064 |
| 2020/0004441 A1* | 1/2020 | Hahn ................... G06F 3/0631 |
| 2020/0050402 A1* | 2/2020 | Furey ................... G06F 3/0688 |
| 2020/0104056 A1* | 4/2020 | Benisty ................. G06F 3/0679 |

OTHER PUBLICATIONS

Cluster Management Using OnCommand® System Manager, See particularly p. 278.

* cited by examiner

NON-VOLATILE MEMORY DATA WRITE MANAGEMENT

BACKGROUND

Conventionally, a host device sends storage commands to a storage device using a block protocol. The storage command uniquely identifies a data block on the storage media using a logical block address (LBA). In certain block storage protocols, hosts, and applications executing on the host, can now, optionally, use both an LBA and a partition identifier to uniquely identify a data block on the storage media.

The storage device recognizes the partition identifier as a unique identifier for a logical partition of the storage media.

In the industry, a logical partition is referred to as a logical unit number (LUN) (with a LUN as the partition identifier) or as a namespace (with a namespace identifier (NSID) as the partition identifier). Both logical unit number and namespace can be used interchangeably herein. Both LUN and namespace identifier can be used interchangeably herein.

Certain storage devices leverage the NSID in the storage commands to group data on the storage media physically together for storage commands with the same NSID. However, workloads for applications using one namespace may have similar characteristics to workloads for applications using another namespace. If there is a relationship between the two namespaces, the host may not communicate this relationship to the storage device. Consequently, because the storage device is unaware of a relationship between two sets of data for different namespaces the storage device may physically place the data for each respective namespace in a suboptimal manner.

In a solid state storage device, physical placement of data is done when determine which open memory block to use for storing new write data. When opening memory blocks to store data, conventional non-volatile memory systems open a memory block from a free block list. It would be desirable for a storage device such as a non-volatile memory storage device to determine a relationship between namespaces and utilize the relationship when selecting an open memory block for the storage of data in order to increase operational performance and reduce wear-leveling operations on the non-volatile memory.

BRIEF SUMMARY

This disclosure relates to an apparatus, a system, and a method pertaining to write management of non-volatile memory based on relationships between namespaces associated with data written. The apparatus disclosed herein comprises a non-volatile memory having a plurality of open erase blocks. This apparatus further comprises a storage controller that is configured to manage the open erase blocks concurrently. The storage controller is further configured to determine a relationship between a first namespace and a second namespace based on a plurality of workload attributes for the first namespace and the second namespace. Finally, the storage controller is configured to store data associated with the second namespace in the open erase block that stores data associated with the first namespace based on the relationship.

The system disclosed herein comprises a non-volatile memory array comprising a plurality of dies. This system further comprises a plurality of open logical erase blocks, each of the open logical erase blocks comprising a physical erase block from each of the dies of the non-volatile memory array. This system also includes a write data pipeline configured to receive write commands from a plurality of hosts, each of the write commands comprising a namespace identifier. This system further comprises a workload analyzer configured to determine that a first namespace for a first host relates to a second namespace for a second host based on workload attributes for the write commands from the first host and on the workload attributes for the write commands from the second host. This system includes an open erase block manager configured to maintain two or more of the open logical erase blocks for receiving write data. Finally, this system comprises a data allocator configured to direct, based on an implied relationship, the open erase block manager to group data of the write commands having the a first namespace identifier into a common one of two or more of the open logical erase blocks as the write commands having a second namespace identifier.

The method disclosed herein comprises receiving storage commands, each of the storage commands comprising a namespace identifier. This method further comprises monitoring the storage commands for data associated with at least one of the namespace identifiers until a monitoring threshold is satisfied. The method includes determining a commonality between the storage commands associated with a first namespace identifier for a first namespace and the storage commands associated with a second namespace identifier for a second namespace. Finally, this method comprises grouping data associated with the first namespace identifier and data associated with the second namespace identifier in a common open erase block based on the commonality.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

An open block management apparatus, system, and method for non-volatile memory devices is disclosed herein, providing improved performance for namespace-based host applications.

A namespace identifier (also referred to as namespace ID or a namespace orientation) is used to determine the open blocks to which to direct data of storage commands. The namespace identifier is used as a hint provided by the host device to categorize, organize, and associate the data with a specific host application. Other parameters may be utilized to route the data to an open block as well. The non-volatile memory device maintains a list of namespace identifiers that represent namespaces used by each open block. A benefit of the disclosed technique is fewer de-fragmentation operations and more efficient memory garbage collection.

Specific embodiments and examples described herein may refer to implementations in a solid state device/drive. Generally, the disclosed techniques are applicable in any storage device that includes non-volatile memory.

In one embodiment, a maximum number of open blocks supported by a non-volatile memory device is equal to a maximum number of supported namespace IDs. In this implementation, each open block may be uniquely assigned to a dedicated namespace identifier. In another embodiment, the non-volatile memory device may implement private namespaces and shared namespaces. Private namespaces do not share the same open block while shared namespaces may share the same open blocks with data from other namespaces.

In an additional embodiment, the temperature (also referred to as access frequency of the data over time) of a namespace is determined. If the namespace is accessed frequently by the host device, the namespace is classified as a hot namespace. Otherwise, it is classified as a cold namespace. This classification may be used when assigning a namespace with an open block. In general, the method may allow hot namespaces to share the same block while minimizing or precluding the mixture of hot and cold namespaces in a specific open block.

In some embodiments, multiple host devices (also referred to herein as hosts), or host applications, may use a shared memory space, and each host may be assigned a separate namespace. In some embodiments, different namespaces may be used for data written in sequential order than the namespaces that are used for data written in a random selection of logical block addresses (LBAs).

Some embodiments may group data differently during regular writes and garbage collection (GC) writes, also referred to as maintenance operation writes. Relationships, or associations between namespaces may be determined during write commands, read commands, or both. Workload attributes may be prioritized, with some attributes determining namespace grouping within open blocks in preference of others.

Figure 1:
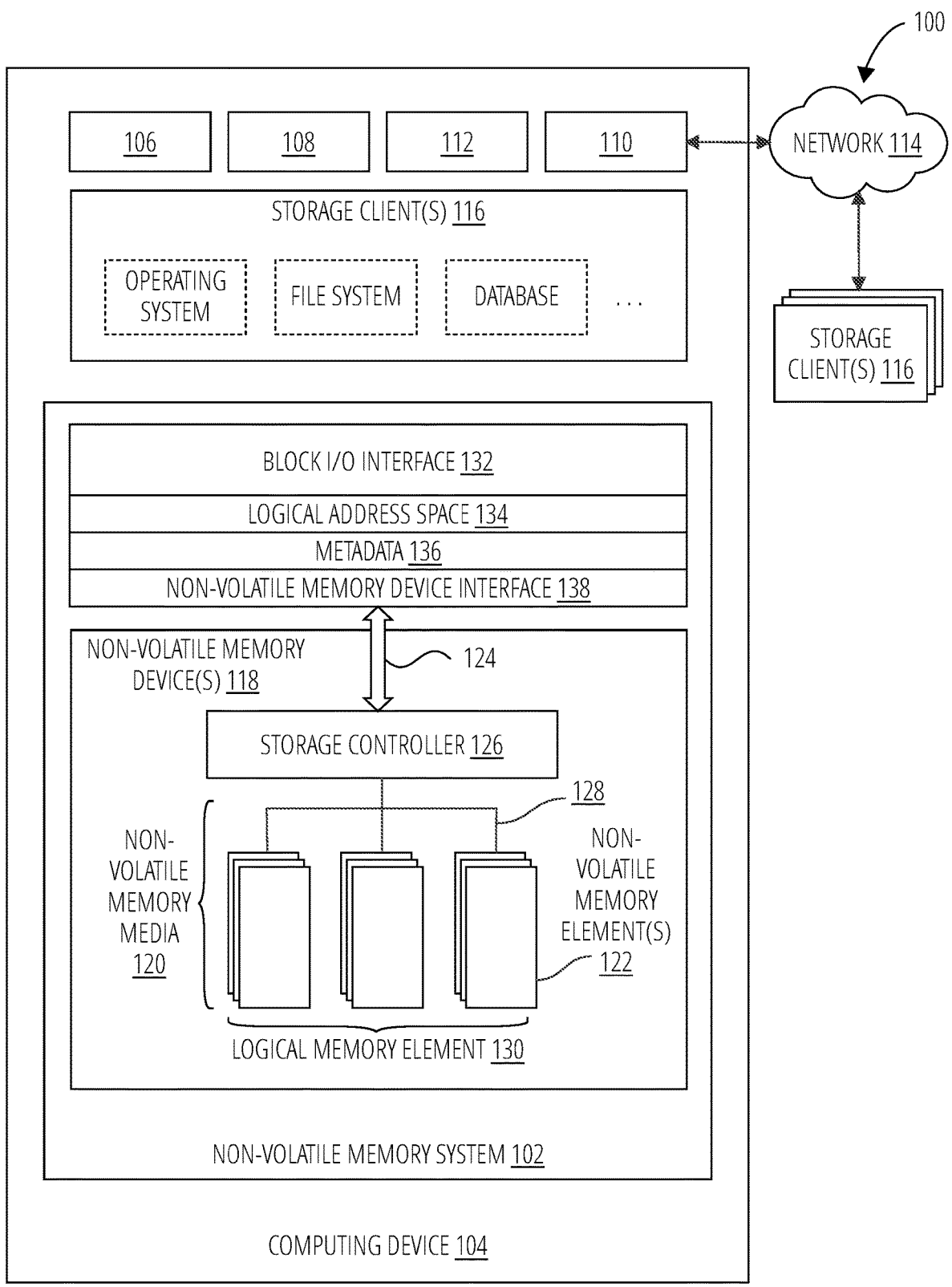
FIG. 1 is a schematic block diagram illustrating one embodiment of a system 100 for data write management.

FIG. 1 is a block diagram of one embodiment of a system 100 comprising non-volatile memory device(s) 118 configured in accordance with an embodiment of the claimed solution. A non-volatile memory system 102 of a computing device 104 may comprise a processor 106, volatile memory 108, and a communication interface 110. The processor 106 may comprise one or more central processing units, one or more general-purpose processors, one or more application-specific processors, one or more virtual processors (e.g., the computing device 104 may be a virtual machine operating within a host), one or more processor cores, or the like. The communication interface 110 may comprise one or more network interfaces configured to communicatively couple the computing device 104 and/or storage controller 126 to a communication network 114, such as an Internet Protocol (IP) network, a Storage Area Network (SAN), wireless network, wired network, or the like.

The non-volatile memory device(s) 118, in various embodiments, may be disposed in one or more different locations relative to the computing device 104. In one embodiment, the non-volatile memory device(s) 118 comprises one or more non-volatile memory element(s) 122, such as semiconductor chips, memory die, or packages or other integrated circuit devices disposed on one or more printed circuit boards, storage housings, and/or other mechanical and/or electrical support structures. For example, the non-volatile memory device(s) 118 may comprise one or more direct inline memory module (DIMM) cards, one or more expansion cards and/or daughter cards, a solid-state-drive (SSD) or other hard drive device, and/or may have another memory and/or storage form factor known to those of skill in the art. The non-volatile memory device(s) 118 may be integrated with, and/or mounted on, a motherboard of the computing device 104, installed in a port and/or slot of the computing device 104, installed on a different computing device 104 and/or a dedicated storage appliance on the network 114, in communication with the computing device 104 over an external bus (e.g., an external hard drive), or the like.

The non-volatile memory device(s) 118, in one embodiment, may be disposed on a memory bus of a processor 106 (e.g., on the same memory bus as the volatile memory 108, on a different memory bus from the volatile memory 108, in place of the volatile memory 108, or the like). In a further embodiment, the non-volatile memory device(s) 118 may be disposed on a peripheral bus of the computing device 104, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fiber Channel connection, a Universal Serial Bus (USB), a PCIe Advanced Switching (PCIe-AS) bus, or the like. In another embodiment, the non-volatile memory device(s) 118 may be disposed on a data network 114, such as an Ethernet network, an InfiniBand network, SCSI RDMA over a network 114, a storage area network (SAN), a local area network (LAN), a wide area network (WAN) such as the Internet, another wired and/or wireless network 114, or the like.

The computing device 104 may further comprise a non-transitory, computer readable storage medium 112. The computer readable storage medium 112 may comprise executable instructions configured to cause the computing device 104 (e.g., processor 111) to perform steps of one or more of the methods disclosed herein.

According to various embodiments, a storage controller 126 may manage one or more non-volatile memory device(s) 118 and/or non-volatile memory element(s) 122. The non-volatile memory device(s) 118 may comprise recording, memory, and/or storage devices, such as solid-state storage device(s) and/or semiconductor storage device(s) that are arranged and/or partitioned into a plurality of addressable storage locations. As used herein, a storage location refers to any physical unit of memory (e.g., any quantity of physical storage media on a non-volatile memory device(s) 118). Memory units may include, but are not limited to: pages, memory divisions, blocks, data blocks, erase blocks, sectors, collections or sets of physical storage locations (e.g., logical pages, logical blocks, logical erase blocks), or the like.

A device driver and/or the storage controller 126, in certain embodiments, may present a logical address space 134 to the storage client(s) 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device(s) 118 may maintain metadata 136, such as a logical to physical address mapping structure, to map logical addresses of the logical address space 134 to storage locations on the non-volatile memory device(s) 118. A device driver may be configured to provide storage services to one or more storage client(s) 116. The storage client(s) 116 may include local storage client(s) 116 operating on the computing device 104 and/or remote, storage client(s) 116 accessible via the network 114 and/or communication interface 110. The storage client(s) 116 may include, but are not limited to: operating systems, file systems, database applications, server applications, kernel-level processes, user-level processes, applications, and the like.

A device driver may be communicatively coupled to one or more non-volatile memory device(s) 118. The one or more non-volatile memory device(s) 118 may include different types of non-volatile memory devices including, but not limited to: solid-state storage devices, semiconductor storage devices, SAN storage resources, or the like. The one or more non-volatile memory device(s) 118 may comprise one or more of a respective storage controller 126 and/or non-volatile memory media 120. A device driver may provide access to the one or more non-volatile memory device(s) 118 via a traditional block I/O interface 132.

In one embodiment, a user application such as software application operating on or in conjunction with the storage client(s) 116 uses the non-volatile memory system 102. The storage client(s) 116 manage files and data and utilizes the functions and features of the storage controller 126 and associated non-volatile memory media 120. Representative examples of storage clients include, but are not limited to, a server, a file system, an operating system, a database management system ("DBMS"), a volume manager, and the like. In one embodiment, the storage client(s) 116 access to the one or more non-volatile memory device(s) 118 via a traditional block I/O interface 132.

Certain conventional block storage devices divide the storage media into volumes or partitions. Each volume or partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or cluster represents a smallest physical amount of storage space on the storage media that is managed by the storage controller 126. A block storage device may associate n blocks available for user data storage across the non-volatile memory media 120 with a logical block address, numbered from 0 to n. In certain block storage devices, the logical block addresses may range from 0 to n per volume or partition. In conventional block storage devices, a logical block address maps directly to a particular logical block.

A device driver may present a logical address space 134 to the storage client(s) 116 through one or more interfaces. As discussed above, the logical address space 134 may comprise a plurality of logical addresses, each corresponding to respective storage locations within the one or more non-volatile memory device(s) 118. A device driver may maintain metadata 136 comprising any-to-any mappings between logical addresses and storage locations, or the like.

A device driver may further comprise and/or be in communication with a non-volatile memory device interface 138 configured to transfer data, commands, and/or queries to the one or more non-volatile memory device(s) 118 over a bus 124, which may include, but is not limited to: a memory bus of a processor 106, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 114, Infiniband, SCSI RDMA, non-volatile memory express (NVMe), or the like. The non-volatile memory device interface 138 may communicate with the one or more non-volatile memory device(s) 118 using input-output control (IO-CTL) command(s), IO-CTL command extension(s), remote direct memory access, or the like.

The communication interface 110 may comprise one or more network interfaces configured to communicatively couple the computing device 104 and/or the storage controller 126 to a network 114 and/or to one or more remote, network-accessible storage client(s) 116. The storage client(s) 116 may include local storage client(s) 116 operating on the computing device 104 and/or remote, storage client(s) 116 accessible via the network 114 and/or the communication interface 110. The storage controller 126 is part of and/or in communication with one or more non-volatile memory device(s) 118. Although FIG. 1 depicts a single non-volatile memory device(s) 118, the disclosure is not limited in this regard and could be adapted to incorporate any number of non-volatile memory device(s) 118.

The non-volatile memory device(s) 118 may comprise one or more non-volatile memory element(s) 122 of non-volatile memory media 120, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory element(s) 122 of non-volatile memory media 120, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory element(s) 122 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 120 is referred to herein as "memory media," in various embodiments, the non-volatile memory media 120 may more generally comprise one or more non-volatile recording media capable of recording data, which may be referred to as a non-volatile memory medium, a non-volatile storage medium, or the like. Further, the non-volatile memory device(s) 118, in various embodiments, may comprise a non-volatile recording device, a non-volatile memory device, a non-volatile storage device, or the like.

The non-volatile memory media 120 may comprise one or more non-volatile memory element(s) 122, which may include, but are not limited to: chips, packages, planes, die, or the like. A storage controller 126 may be configured to manage data operations on the non-volatile memory media 120, and may comprise one or more processors, programmable processors (e.g., FPGAs), ASICs, micro-controllers, or the like. In some embodiments, the storage controller 126 is configured to store data on and/or read data from the non-volatile memory media 120, to transfer data to/from the non-volatile memory device(s) 118, and so on.

The storage controller 126 may be communicatively coupled to the non-volatile memory media 120 by way of a bus 128. The bus 128 may comprise a bus for communicating data to/from the non-volatile memory element(s) 122. The bus 128, in one embodiment, may further comprise a control bus for communicating addressing and other command and control information to the non-volatile memory element(s) 122. In some embodiments, the bus 128 may communicatively couple the non-volatile memory element(s) 122 to the storage controller 126 in parallel. This parallel access may allow the non-volatile memory element(s) 122 to be managed as a group, forming a logical memory element 130. The logical memory element 130 may be partitioned into respective logical memory units (e.g., logical pages) and/or logical memory divisions (e.g., logical data blocks, logical blocks, logical erase blocks). The logical memory units may be formed by logically combining physical memory units of each of the non-volatile memory element(s) 122.

In some embodiments, the storage controller 126 may be configured to store data on one or more asymmetric, write-once media, such as non-volatile memory media 120. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of non-volatile memory media 120 are asymmetric; for example, a read operation may be much faster than a write/program operation, and a write/program operation may be much faster than an erase operation (e.g., reading the media may be hundreds of times faster than erasing, and tens of times faster than programming the media).

The non-volatile memory media 120 may be partitioned into memory divisions that can be erased as a group (e.g., erase blocks) in order to, inter alia, account for the asymmetric properties of the media. As such, modifying a single data sector or data block in-place may require erasing the entire erase block comprising the data, and rewriting the modified data to the erase block, along with the original, unchanged data. This may result in inefficient "write amplification," which may excessively wear the non-volatile memory media 120.

Therefore, in some embodiments, the storage controller 126 may be configured to write data out-of-place. As used herein, writing data "out-of-place" refers to writing data to different physical storage location(s) rather than overwriting the data "in-place" (e.g., overwriting the data in the original physical location). Modifying data out-of-place may avoid write amplification, since existing, valid data on the erase block with the data to be modified need not be erased and rewritten. Moreover, writing data out-of-place may remove erasure from the latency impact of certain storage operations.

The storage controller 126 may be organized into a plurality of erase blocks of word lines within a non-volatile memory element(s) 122, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of an erase block within a non-volatile memory element(s) 122 may be physically arranged in a monotonically increasing sequence of word line addresses, with consecutively addressed word lines also being physically adjacent (e.g., WL0, WL1, WL2, . . . WLN).

The storage controller 126 may comprise and/or be in communication with a device driver executing on the computing device 104. A device driver may provide storage services to the storage client(s) 116 via one or more interfaces (block I/O interface 132 and/or others). In some embodiments, a device driver provides a computing device 104 block I/O interface 132 through which storage client(s) 116 perform block-level I/O operations.

A device driver may further comprise a non-volatile memory device interface 138 that is configured to transfer data, commands, and/or queries to the storage controller 126 over a bus 124, as described above.

Figure 2:
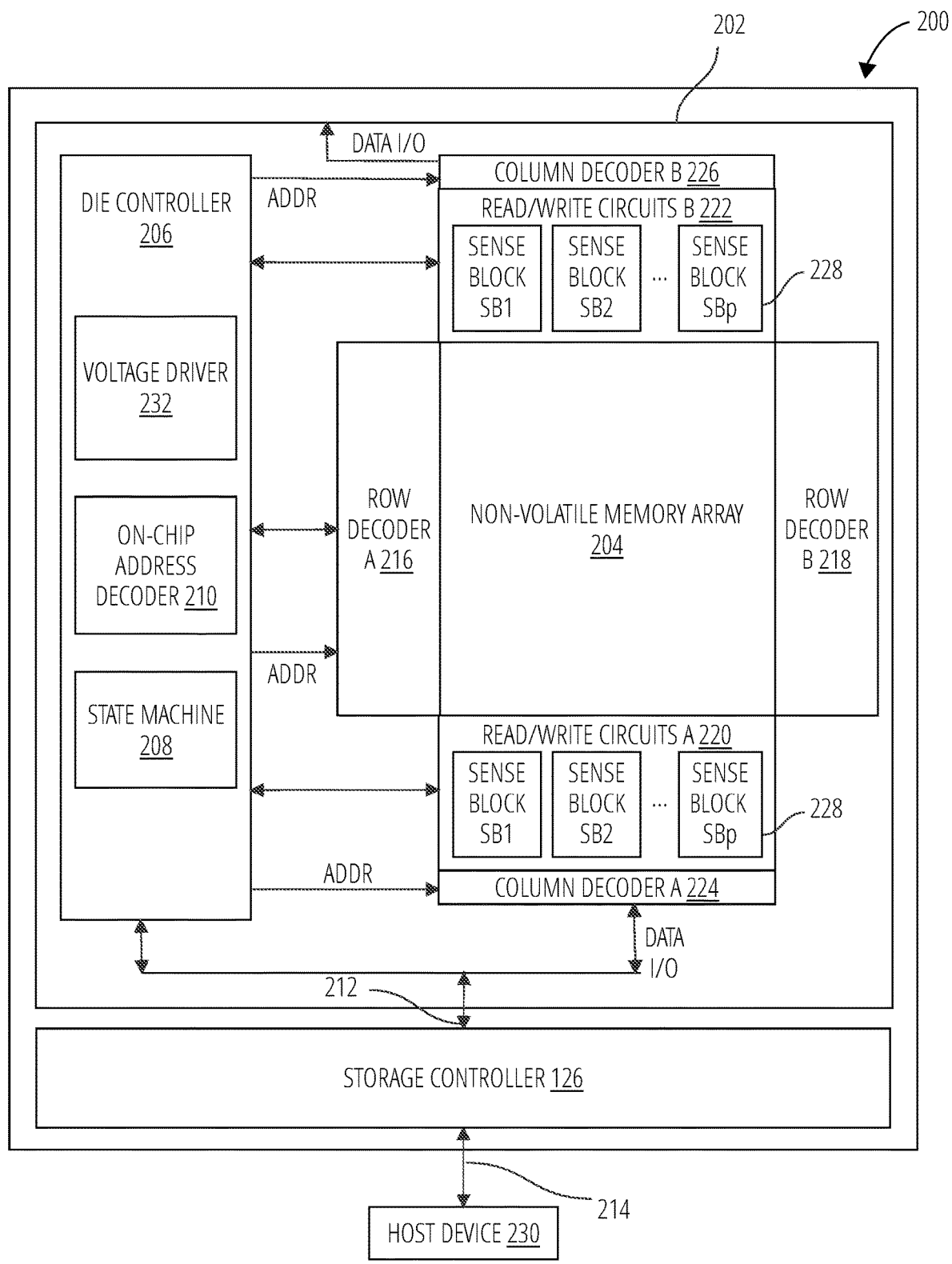
FIG. 2 is a schematic block diagram illustrating another embodiment of a system 200 for data write management.

FIG. 2 illustrates an embodiment of a non-volatile storage system 200 that may include one or more memory die(s) 202 or chips. Memory die(s) 202, in some embodiments, include a non-volatile memory array 204 (two-dimensional or three dimensional) of memory cells, die controller 206, read/write circuits A 220, and read/write circuits B 222. In one embodiment, access to the non-volatile memory array 204 by the various peripheral circuits is implemented in a symmetric fashion, on opposite sides of the array, so that the densities of access lines and circuitry on each side are reduced by half. The read/write circuits A 220 and read/write circuits B 222, in a further embodiment, include multiple sense amplifiers 228 which allow a page of memory cells to be read or programmed in parallel.

The non-volatile memory array 204, in various embodiments, is addressable by word lines via row decoder A 216 and row decoder B 218 and by bit lines via column decoder A 224 and column decoder B 226. In some embodiments, a storage controller 126 is included in the same memory system 200 (e.g., a removable storage card or package) as the one or more memory die(s) 202. Commands and data are transferred between the host device 230 and storage controller 126 via lines 214 and between the controller and the one or more memory die(s) 202 via lines 212. One implementation can include multiple memory die(s) 202.

Die controller 206, in one embodiment, cooperates with the read/write circuits A 220 and read/write circuits B 222 to perform storage/memory operations on the non-volatile memory array 204. The die controller 206, in certain embodiments, includes a voltage driver 232, a state machine 208, and an on-chip address decoder 210. In one embodiment, the state machine 208 comprises at least a portion of the voltage driver 232. In another embodiment, the storage controller 126 comprises at least a portion of the voltage driver 232.

The voltage driver 232, in one embodiment, is configured to supply a voltage to one or more components of the memory array. The magnitude of the voltage and whether the voltage level supplied is increasing or decreasing depends on which storage operation that the die controller 206 is implementing. At one point during an operation, the voltage level provided by the voltage driver 232 may comprise an analog signal increasing from ground or zero voltage, or a level substantially close to zero, to a desired voltage level required by components coupled to the voltage driver 232 to implement the desired operation. As the voltage applied to a component coupled to the voltage driver 232 increases, the period of time during which the voltage level is changing is referred to herein as charging, pre-charging, or ramping up.

At another point during an operation, the voltage level provided by the voltage driver 232 may comprise an analog signal configured to maintain a voltage level required by components coupled to the voltage driver 232 for a particular stage of implementing a desired operation. As the voltage applied to a component coupled to the voltage driver 232 remains substantially at the desired voltage level, the period of time is referred to herein as a steady state or stable.

At another point during an operation, the voltage level provided by the voltage driver 232 may comprise an analog signal decreasing from a desired voltage level to a lower voltage level, a ground level, or zero voltage, or a level substantially close to zero, for a desired operation. As the voltage applied to a component coupled to the voltage driver 232 decreases the period during which the voltage level is changing is referred to herein as discharging, post-charging, or ramping down.

The state machine 208, in one embodiment, provides chip-level control of storage and/or memory operations. The on-chip address decoder 210 provides an address interface to convert between the address that is used by the host or a memory controller to the hardware address used by the row decoder A 216, row decoder B 218, column decoder A 224a, and column decoder B 226. The state machine 208 includes logic for activating and controlling the voltage driver 232 and other logic coupled to circuits in electrical communication with the voltage driver 232.

In one embodiment, one or any combination of die controller 206, voltage driver 232, on-chip address decoder 210, state machine 208, row decoder A 216, row decoder B 218, column decoder A 224, column decoder B 226, read/write circuits A 220, read/write circuits B 222, and/or storage controller 126 can be referred to as one or more managing circuits.

Figure 3:
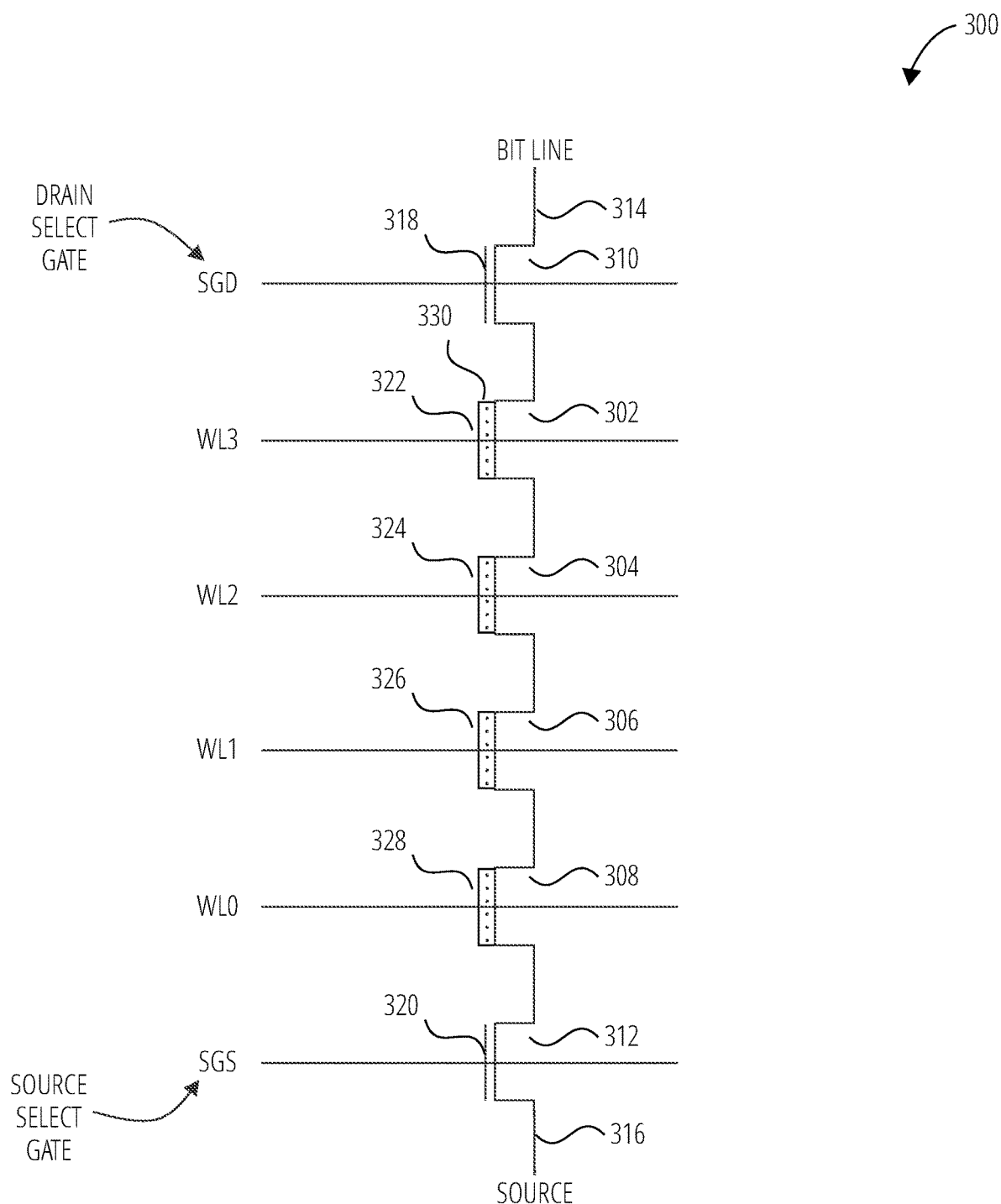
FIG. 3 is a schematic block diagram illustrating one embodiment of a NAND string 300.

FIG. 3 depicts one embodiment of a NAND string 300 comprising a plurality of storage cells. The NAND string 300 depicted in FIG. 3, in some embodiments, includes four transistors (transistor 302, transistor 304, transistor 306, and transistor 308) connected in series and located between a first select transistor 310 and a second select transistor 312. In some embodiments, the transistor 302, transistor 304, transistor 306, and transistor 308 each include a control gate with a charge trap layer 330. Control gate 322, control gate 324, control gate 326, and control gate 328, in one embodiment, are connected to, or comprise a portion of, a word line. In a further embodiment, transistor 302, transistor 304, transistor 306, and transistor 308 are storage cells, storage elements, or the like, also referred to as memory cells. In some embodiments, a single storage cell may include multiple transistors.

The first select transistor 310, in some embodiments, gates/connects the NAND string 300 to a bit line 314 via a drain select gate/select gate drain (SGD). The second select transistor 312, in certain embodiments, gates/connects the NAND string 300 to a source line 316 via a source select gate/select gate source (SGS). The first select transistor 310, in a further embodiment, is controlled by applying a voltage to a corresponding select gate 318. The second select transistor 312, in some embodiments, is controlled by applying a voltage to corresponding select gate 320.

As shown in FIG. 3, the source line 316, in one embodiment, is connected to the sources of each transistor/storage cell in the NAND string 300. The NAND string 300, in some embodiments, may include some storage cells that have been programmed and some storage cells that have not been programmed.

Figure 4:
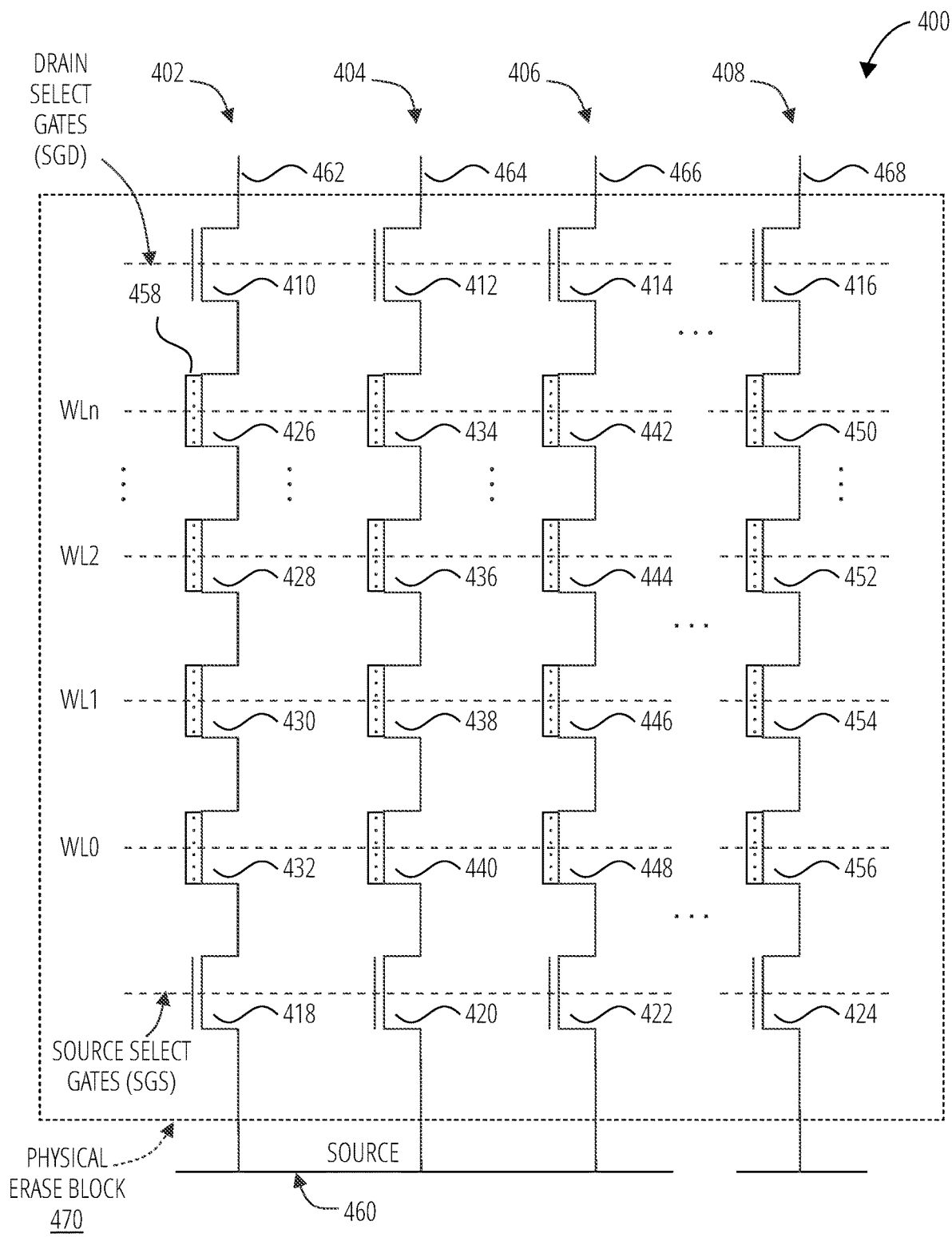
FIG. 4 is a schematic block diagram illustrating one embodiment of a memory array 400.

FIG. 4 is a circuit diagram depicting a memory array 400 comprising a plurality of NAND strings. An architecture for a memory array using a NAND structure may include a significant number of NAND strings. For example, FIG. 4 illustrates a memory array 400 that includes NAND string 402, NAND string 404, NAND string 406, and NAND string 408. In the depicted embodiment, each NAND string includes drain select transistors (select transistor 410, select transistor 412, select transistor 414, and select transistor 416), source select transistors (select transistor 418, select transistor 420, select transistor 422, select transistor 424), and storage cells (426, 428, 430, 432, 434, 436, 438, 440, 442, 444, 446, 448, 450, 452, 454, and 456). The storage cells may be transistors that incorporate a charge trap layer 458. While four storage elements per NAND string are illustrated for simplicity, some NAND strings may include any number of storage elements, e.g., thirty-two, sixty-four, or the like storage elements/storage cells.

NAND string 402, NAND string 404, NAND string 406, and NAND string 408, in one embodiment, are connected to a source line 460 by source select transistor 418, select transistor 420, select transistor 422, and select transistor 424, respectively. A source select line SGS may be used to control the source side select transistors, 418, 434, 450, 466. The various NAND strings, in one embodiment, are connected to bit line 462, bit line 464, bit line 466, and bit line 468 by drain select transistor 410, select transistor 412, select transistor 414, and select transistor 416, respectively, as shown. The drain select transistors may be controlled by a drain select line SGD. In some embodiments, the select lines do not necessarily need to be common among the NAND strings; that is, different select lines can be provided for different NAND strings.

As described above, each word line WL0-WLn comprises one or more storage cells. In the depicted embodiment, each of bit line 462, bit line 464, bit line 466, and bit line 468, and the respective NAND string 402, NAND string 404, NAND string 406, and NAND string 408, comprise the columns of the memory array 400, storage block, physical erase block 470, or the like. These columns may also be referred to as channels. The word lines WL0-WLn, in some embodiments, comprise the rows of the memory array 400, storage block, physical erase block 470, or the like. Each word line WL0-WLn, in some embodiments, connects the control gates of each storage cell in a row. Alternatively, the control gates functionality may be provided by the word lines WL0-WLn themselves. In some embodiments, a word line WL0-WLn may include tens, hundreds, thousands, millions, of storage cells.

In one embodiment, each storage cell is configured to store data. For example, when storing one bit of digital data, the range of possible threshold voltages ("VTH") of each storage cell may be divided into two ranges which are assigned logical data "1" and "0." As used herein, threshold voltage refers to a magnitude of voltage applied to the gate of a storage cell sufficient to cause the storage cell to activate. In embodiments, in which the storage cell is a NAND transistor, the threshold voltage is a sufficient voltage applied to a gate terminal of the transistor that causes the transistor to conduct current between its source terminal and drain terminal. In one example of a NAND type flash memory, the VTH may be negative after the storage cells are erased, and defined as logic "1." in one embodiment, the VTH after a program operation is positive and defined as logic "0."

When the VTH is negative and a read is attempted, in some embodiments, storage cells will turn on to indicate logic "1" is being stored. When the VTH is positive and a read operation is attempted, in a further embodiment, a storage cell will not turn on, which indicates that logic "0" is stored. Each storage cell may also store multiple levels of information, for example, multiple bits of digital data. In such an embodiment, the range of VTH value is divided into the number of levels of data. For example, if four levels of information can be stored in each storage cell, there will be four VTH ranges assigned to the data values "11", "10", "01", and "00."

In one example of a NAND type memory, the VTH after an erase operation may be negative and defined as "11." Positive VTH values may be used for the states of "10", "01", and "00." in one embodiment, the specific relationship between the data programmed into the storage cells and the threshold voltage ranges of the storage cells depends upon the data encoding scheme adopted for the storage cells.

The storage controller 126 of FIG. 1 may be organized into a plurality of physical erase block 470 of word lines within non-volatile memory element(s) 122, in certain embodiments, using addresses of the word lines, such that the word lines are logically organized into a monotonically increasing sequence (e.g., decoding and/or translating addresses for word lines into a monotonically increasing sequence, or the like). The memory string components that may comprise a physical erase block 470 are indicated herein. In a further embodiment, word lines of the physical erase block 470 may be physically arranged in a monotonically increasing sequence of word line addresses, with consecutively addressed word lines also being physically adjacent (e.g., WL0, WL1, WL2, ... WLN).

Figure 5:
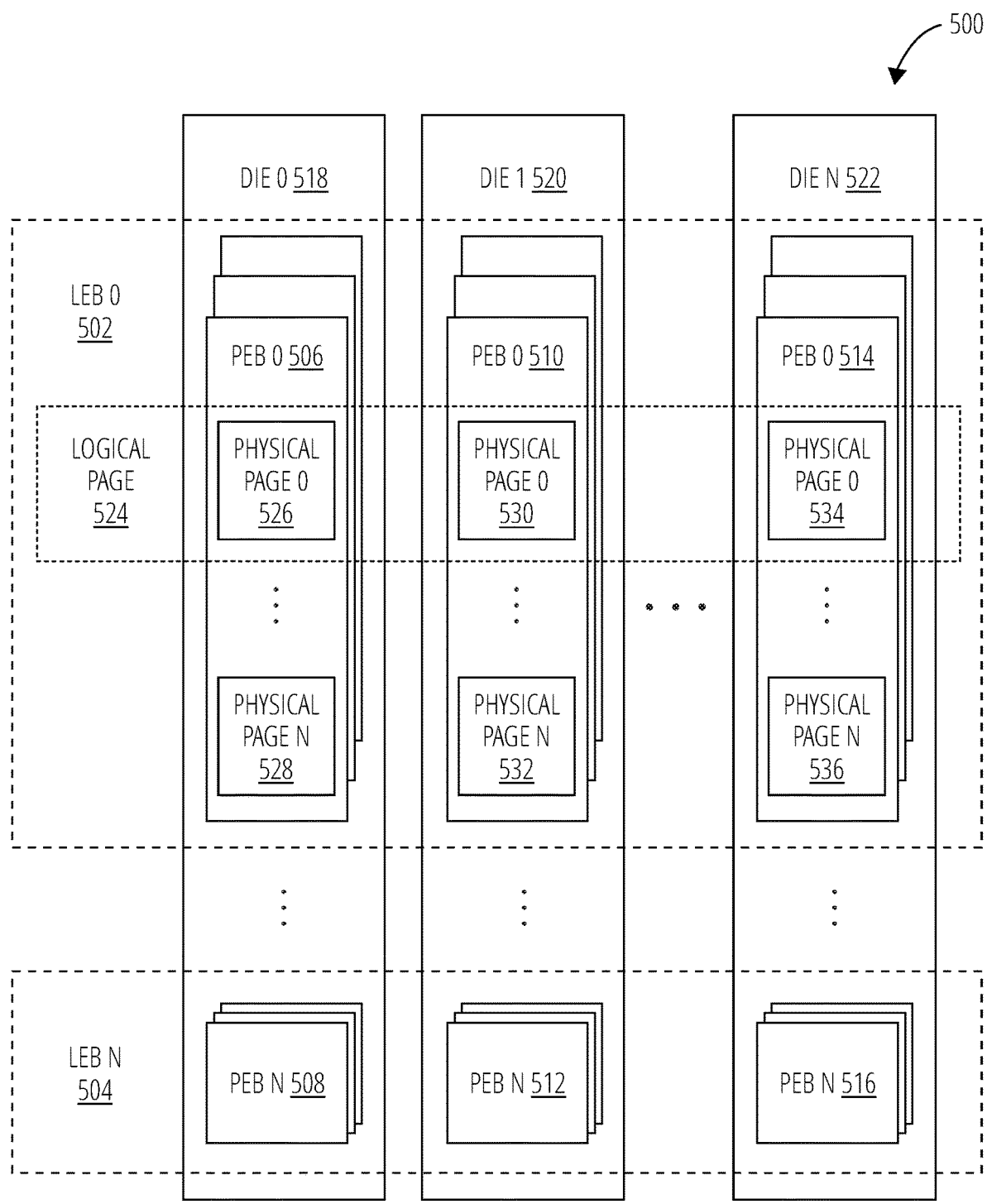
FIG. 5 illustrates a storage device 500 in accordance with one embodiment.

FIG. 5 illustrates a storage device 500 in accordance with one embodiment. In the illustrated embodiment, storage device 500 is organized into logical erase blocks (LEBs), as shown by logical erase block 0 502 and logical erase block n 504. These LEBs include multiple physical erase blocks (PEBs) illustrated by physical erase block 0 506, physical erase block n 508, physical erase block 0 510, physical erase block n 512, physical erase block 0 514, and physical erase block n 516. These are located in separate storage dies, shown as die 0 518, die 1 520, and die n 522. Those of skill in the art appreciate the relationship and differences between physical erase block and a logical erase block and may refer to one, or the other, or both by using the short hand version erase block. Those of skill in the art understand from the context of the reference to an erase block whether a physical erase block or a logical erase block is being referred to. The concepts and techniques used in the art and those recited in the claims can be equally applied to either physical erase blocks or logical erase blocks.

A logical erase block such as logical erase block 0 502 is further divided into multiple logical pages (logical page 524) that, in turn, includes multiple physical pages, such as physical page 0 526, physical page n 528, physical page 0 530, physical page n 532, physical page 0 534, and physical page n 536. Physical pages may include multiple packets, which may be grouped into error correction code (ECC) chunks.

As used herein, the term "erase block" refers broadly to a logical erase block or a physical erase block. In one embodiment, a physical erase block represent the smallest storage unit within a given die that can be erased at a given time (e.g., due to the wiring of storage cells on the die). In one embodiment, logical erase blocks represent the smallest block erasable by a storage controller in response to receiving an erase command. In such an embodiment, when the storage controller receives an erase command specifying a particular logical erase block, the storage controller may erase each physical erase block within the block simultaneously. It is noted that physical erase blocks within a given logical erase block (e.g., physical erase block 0 506 and physical erase block 0 510 within logical erase block 0 502) may be considered as contiguous within a physical address space even though they reside in separate dies. Thus, the term "contiguous" may be applicable not only to data stored within the same physical medium, but also to data stored within separate media.

In one embodiment, a physical page represents the smallest storage block within a given die that can be written to at a given time. In one embodiment, a logical page is the smallest writable storage block supported by the storage controller. (in one embodiment, the storage controller may include a buffer configured to store up to a logical page worth of data; upon filling the buffer, the storage controller may write the contents of the buffer to a single logical page simultaneously.) In some instances, dividing a logical page across multiple dies may result in faster access times for a set of data when multiple dies are accessed in parallel.

In some embodiments, a driver may associate metadata 136 (as shown in FIG. 1) with one or more of the storage blocks (logical erase blocks, physical erase blocks, logical pages, and/or physical pages). As used herein, the term "metadata" refers to system data usable to facilitate operation of solid-state storage device 500; metadata stands in contrast to, for example, data produced by an applications (i.e., "application data") or forms of data that would be considered by an operating system as "user data." For example, in one embodiment, a logical erase block may include metadata specifying, without limitation, usage statistics (e.g., the number of program erase cycles performed on that block), health statistics (e.g., a value indicative of how often corrupted data has been read from that block), security or access control parameters, sequence information (e.g., a sequence indicator), a persistent metadata flag (e.g., indicating inclusion in an atomic storage operation), a transaction identifier, or the like. In some embodiments, a logical erase block includes metadata identifying the logical addresses for which it stores data, as well as the respective numbers of stored data packets for each logical block or sector within a logical address space 134.

A logical address space represents the organization of data as perceived by higher-level processes such as applications and operating systems. In one embodiment, a physical address space represents the organization of data on the physical media. This is shown in more detail in FIG. 6.

In one embodiment, the header within a data packet may include packet metadata such as one or more LBAs associated with the contained data, the packet size, linkages to other packets, error correction checksums, etc. In various embodiments, a driver may use this information, along with other forms of metadata, to manage operation of storage device 500. For example, the driver might use this information to facilitate performance of read and write operations, recover the storage device 500 to a previous state (including, for example, reconstruction of various data structures used by driver and/or replaying a sequence of storage operations performed on storage device 500), etc. Various forms of this metadata may be used to estimate access frequency statistics.

Figure 6:
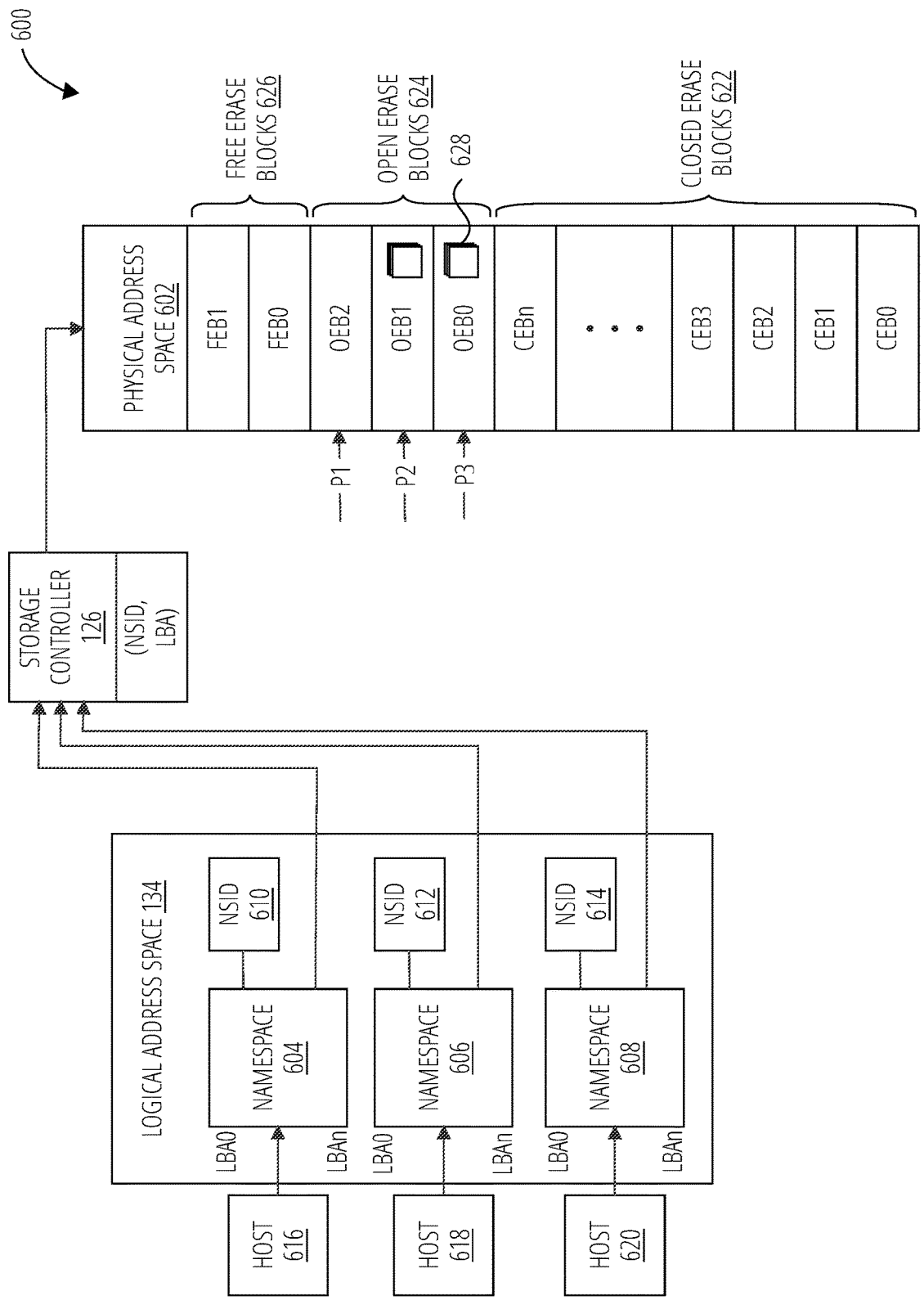
FIG. 6 illustrates a system 600 in accordance with one embodiment.

FIG. 6 illustrates a relationship between a logical address space 134 and a physical address space 602 on the memory array. The logical address space 134, in one embodiment, is divided into logical addresses corresponding to respective data blocks. In some embodiments, the logical addresses are LBAs (in other embodiments, the logical addresses may correspond to some other form of logical identifiers). in one embodiment, a namespace is a range of contiguous unique and monotonically increasing logical block addresses.

In one embodiment, data blocks may represent the smallest amount of data associated with a given logical address. Data blocks may be further divided into sectors. As but one example, a sector may be 512 bytes and a data block may include 8 sectors and be 4 KB. Data blocks are quantities of space allocated for and storing data on the physical address space 602. The LBAs represent the data blocks in the logical address space 134.

The logical address space 134 is further divided into namespaces. A namespace is a logical sub-dividing of the logical address space 134. A namespace may also be interchangeably referred to as a logical partition or logical unit number (LUN). in one embodiment, a namespace is a range of contiguous and monotonically increasing logical block addresses. Each namespace of a plurality of namespaces represented in the logical address space 134 comprises a set of logical block addresses (LBA). FIG. 6 illustrates, as an example, a division of the logical address space 134 into three namespaces (namespace 604, namespace 606, namespace 608). The logical block addresses of each namespace are not unique between namespaces. For example, each namespace includes LBA0, LBA1, LB2, etc. In order to translate a namespace LBA to an LBA in the logical address space 134, each namespace is uniquely identified using a namespace identifier (NSID, e.g., NSID 610, NSID 612, NSID 614).

A namespace identifier (NSID), as used herein, comprises any indication that uniquely identifies one namespace with respect to other namespaces within the same logical address space. For example, a namespace identifier may include a file identifier and/or an offset from a file system namespace, a logical unit number (LUN), a LUN ID and an offset from a LUN namespace, an LBA, or LBA range from a storage namespace, one or more virtual memory addresses from a virtual memory namespace, a volatile memory address from a volatile memory namespace of the host device, an object identifier, a network address, a GUID, UUID, a BAR address or address range from a BAR namespace, another logical identifier, or the like. In a further embodiment, a namespace identifier may comprise a label or a name for a namespace, such as a directory, a file path, a device identifier, or the like. In another embodiment, a namespace identifier may comprise a physical address or location for data.

Referring still to FIG. 6, a plurality of host devices (host 616, host 618, and host 620) are assigned at least one namespace designated by a corresponding NSID (e.g., NSID 610, NSID 612, NSID 614). The hosts assign write command (and the associated data) to LBAs within their assigned namespace. The LBAs of the namespace range from LBA0 to LBAn, in one example. (FIG. 6 illustrates each namespace having the same size, but other embodiments have namespaces of different sizes). In this example, host 616 is allotted/assigned namespace 604, identified by NSID 610. Host 618 is allotted/assigned namespace 606, identified by NSID 612. Finally, host 620 is allotted/assigned namespace 608, identified by NSID 614.

The storage controller 126 manages where host data is stored in physical memory. Specifically, the storage controller 126 translates or maps between logical identifiers in the logical address space 134 to physical addresses in physical address space 602. In the embodiment illustrated in FIG. 6, the storage controller 126 translates a logical identifier that includes an NSID and an LBA into a physical address for the LBA on the storage media. The storage controller 126 may develop a table, or other data structure, relating the NSID and LBA of the data used by the host to a physical address within the physical address space 602.

The physical address space 602, in one embodiment, is divided into physical addresses corresponding to the arrangement of data on the physical recoding media. In the embodiments described herein, the physical recording media is asymmetric, write-once media, such as non-volatile memory media 120. The storage controller 126 manages the non-volatile memory media 120 in such a way as to overcome certain challenges of asymmetric, write-once media. One technique used by the non-volatile memory media 120 is to maintain a set of open erase blocks 624 that are prepared to receive data associated with write commands.

An open erase block is an erase block (logical or physical) that is prepared to accept data blocks. Typically, the storage controller 126 buffers data blocks until a full page (logical or physical) of data blocks are ready to be written to the non-volatile memory array. The storage controller 126 then writes these buffered data blocks in parallel by writing a whole page (typically a logical page) at a time. The storage controller 126 may maintain a pointer to the next physical address for a subsequent logical page. Because the storage controller 126 has information about how data blocks are organized in a logical page, the storage controller 126 can determine a physical address for each logical block. Generally, data blocks are written to erase block in a predetermined order to provide high performance and reliability using the non-volatile memory media 120. As data blocks are written, the space available, within the erase block, for new data blocks decreases. Eventually, the erase block fills and the erase block is closed.

A closed erase block is an erase block that is full of data blocks and has no more physical space for data blocks. An erase block includes certain metadata to facilitate management of the erase block. Among other data, the metadata may identify timing information for when the erase block was last erased, when the erase block was first written to, how often an erase block has been erased, and the like. In certain embodiments, this metadata may also indicate data useful for performing maintenance operations on the erase block. In certain embodiments, the metadata may indicate how many data blocks in the erase block contain valid data, data that has not been changed since it was last written. The storage controller 126 prepares the metadata and may store the metadata with the erase block, for example in a header. In certain embodiments, once the metadata is stored, the erase block is considered a closed erase block, even if the erase block was not filled with data blocks. Once an erase block becomes a closed erase block, no more data blocks are written to the closed erase block, in one embodiment.

FIG. 6 illustrates a set of closed erase blocks 622 (CEB0-CEBn), a set of open erase blocks 624 (OEB0-OEB2), and a set of free erase blocks 626 (FEB0, FEB1). free erase blocks 626 are erase blocks that have been erased by the storage controller 126 and no longer hold data. New original erase blocks that have not yet been written to are also free erase blocks 626.

In one embodiment, the content of data blocks may be stored as packets within logical erase blocks.

In one embodiment, the physical address space 602 may be organized as a log structure, in which write operations may be performed at only one or more append points, such as locations within open erase blocks 624.

In the illustrated embodiment, data may be stored only in open erase blocks 624. The storage controller 126 may manage two or more open erase blocks 624 concurrently. Having more than one open erase block open at any given time, permits the storage controller 126 to handle multiple write command at the same time. Latency impact during a write operation in one open erase block can be mitigated by performing other write operations on other open erase blocks. The number of open erase blocks 624 a storage controller 126 manages may be limited by the amount of volatile memory available to the storage controller 126. The storage controller 126 may track open erase blocks 624 using pointers (P1, P2, P3). In the illustrated embodiment, three pointers are shown designating three corresponding open erase blocks 624. However, different implementations may include more or less than three points and more or less than three corresponding open erase blocks 624.

In some embodiments, an open erase block may be dedicated to storing data flagged with a single namespace identifier. Such data may be assigned to a private namespace, and may be required to be stored physically and logically separate from other data. This is discussed in further detail with regard to FIG. 12 and FIG. 13. In other embodiments, data may be written to any open erase block, but there may be benefits to grouping data for two or more namespaces into a particular open erase block. In some cases, a threshold number of pages 628 (logical pages) may be reserved as free memory in each of the open erase blocks 624, such that some free erase blocks 626 may need to be opened even when space still remains in currently open erase blocks 624.

Figure 7:
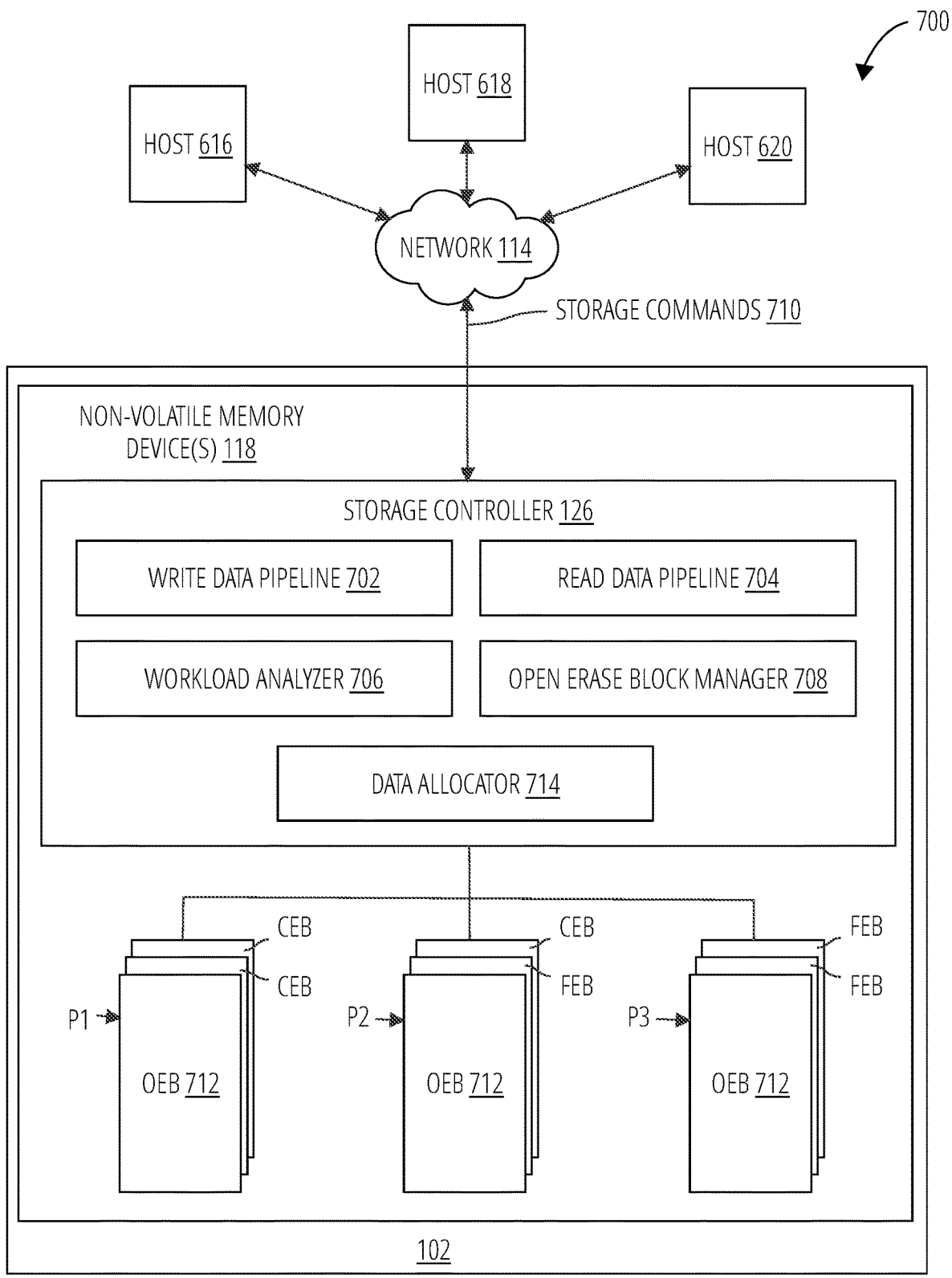
FIG. 7 illustrates a system 700 in accordance with one embodiment.

FIG. 7 illustrates a system 700 in accordance with one embodiment. This system comprises the functionality necessary for the solution disclosed herein, including a network 114, non-volatile memory device(s) 118, a storage controller 126, one or more hosts (host 616, host 618, and host 620), a write data pipeline 702, a read data pipeline 704, a workload analyzer 706, an open erase block manager 708, storage commands 710, at least one open erase block 712, and a data allocator 714. FIG. 7 refers to elements of FIG. 1, like numbers referring to like elements. The storage controller 126 includes the write data pipeline 702, the read data pipeline 704, the workload analyzer 706, the open erase block manager 708, and the data allocator 714.

In one embodiment, host 616, host 618, and host 620 are computing devices (e.g., laptops, desktops, smartphones, tablets, digital cameras). In another embodiment, the hosts are virtual machines operating on a computing device 104.

The storage controller 126 includes a write data pipeline 702 to write data (both system and user) to the solid-state storage (e.g., non-volatile memory media 120) and a read data pipeline 704 to retrieve data (system and/or user) stored on the solid-state storage (e.g., non-volatile memory media 120).

The write data pipeline 702 may include a packetizer that receives data (also referred to as a data segment) to be written to the solid-state storage and creates one or more data packets sized for the solid-state storage. Each data packet may include a header and data from the data segment. The write data pipeline 702 may include an ECC generator that generates one or more ECC chunks for one or more data packets received from the packetizer prior to writing the data packets to the solid-state storage. The read data pipeline 704 may include an ECC decoder that converts one or more ECC chunks retrieved from the solid-state storage into one or more data packets and corrects and/or identifies any errors in the data that is decoded. The read data pipeline 704 may include a depacketizer that receives decoded data (which also may be error corrected) from the ECC decoder and converts the one or more data packets into data (user or system) that may be used to service a read command.

The workload analyzer 706 tracks, or monitors, storage commands 710 received by the non-volatile memory system 102 in order to determine information about the workloads that the non-volatile memory system 102 is handling. Storage commands as used herein comprises read commands, write commands, maintenance commands, diagnostic commands, test mode commands, and any other command a storage controller 126 may receive. A "workload" as used herein is the number and type of storage commands 710 received and/or serviced by the non-volatile memory system 102 and the outcome or results from servicing those storage commands 710. Workload may also include any statistics about the storage commands 710. In one embodiment, the workload analyzer 706 maintains statics about the storage commands 710 including, but not limited to, how many read commands have been received over a particular time period, how many write commands have been received over a particular time period, how the number of received read commands relates to the number of received write commands, how many errors were found in data retrieved to satisfy read commands, how many correctable errors were found in data retrieved to satisfy read commands, how many write commands succeeded, how many write commands failed, and the like.

As the workload analyzer 706 monitors storage commands 710 (also referred to as input/output IO transactions), the workload analyzer 706 tracks workload attributes that define, describe, or characterize the workloads. As used herein, a "workload attribute" is any quality, characteristic, attribute, feature, behavior, trait, or property about a workload. A workload attribute may be explicitly identified and defined, for example by a storage client. Alternatively, a workload attribute may be implied and may be derived based on other information. Examples of workload attributes are described in relation to FIG. 8.

In one embodiment, the workload analyzer 706 tracks workload attributes about how the workloads relate to the namespaces referenced in the storage commands 710. In a further embodiment, the workload analyzer 706 uses the namespace identifier included in the storage commands 710 to track how namespaces having a first set of workload attributes relate to namespaces having other workload attributes, particularly similar workload attributes.

In one embodiment, the workload analyzer 706 reviews or analyzes the workload attributes and determines patterns, similarities, relationships, and/or commonalities between namespaces that are based on the workload attributes. In certain embodiments, these patterns, similarities, relationships, and/or commonalities are referred to as hints and can be used to optimize the performance of the non-volatile memory device(s) 118. In certain embodiments, the workload analyzer 706 determines, or derives, a relationship between two namespaces based on workload attributes for each namespace. A relationship is any connection or association between the workload attributes of a first namespace in relation to a second namespace. In certain embodiments, the relationship is explicit and determined based on a review of the workload attributes. In other embodiments, the relationship is implicit and is derived based on a review of the workload attributes.

The open erase block manager 708 manages which erase blocks are open erase blocks, which are closed erase blocks, and which are free erase blocks. The open erase block manager 708 keeps track of the physical address within each open erase block 712 where a subsequent page (physical or logical) can be written to that particular open erase block (e.g., P1, P2, P3) and advances the pointers (P1, P2, P3) as data is written to open erase blocks. The open erase block manager 708 determines when the open erase blocks are about to become full, closes open erase blocks to form closed erase blocks, converts free erase blocks into open erase blocks, and coordinates with other components of the storage controller 126 to ensure that sufficient free erase blocks are available.

The data allocator 714 coordinates with the workload analyzer 706 and open erase block manager 708 to determine an optimal physical location for write data on the non-volatile memory media 120. In one embodiment, the data allocator 714 directs the open erase block manager 708 where to store write data within the current open erase blocks. In a particular embodiment, the data allocator 714 directs the open erase block manager 708 to store write data for a first namespace together with write data for a second namespace together in the same open erase block. In this manner, the storage controller 126 leverages a relationship between the first namespace and the second namespace due to their workload attributes. By grouping write data for two namespaces together in the same open erase block, the storage controller 126 uses the relationship to optimize where write data is stored on the non-volatile memory media 120.

In certain embodiments, the data allocator 714 determines that write data belongs to a first namespace based on a first namespace identifier received with the write data and determines that write data belongs to a second namespace based on a second namespace identifier received with other write data.

In some embodiments, the workload analyzer 706 tracks the namespace identifier for each namespace associated with data stored in each open erase block 712 and matches the namespace identifiers to allocate recently received write data to an open erase block that stores data for a namespace having a relationship to the namespace of the recently received write data.

Figure 8:
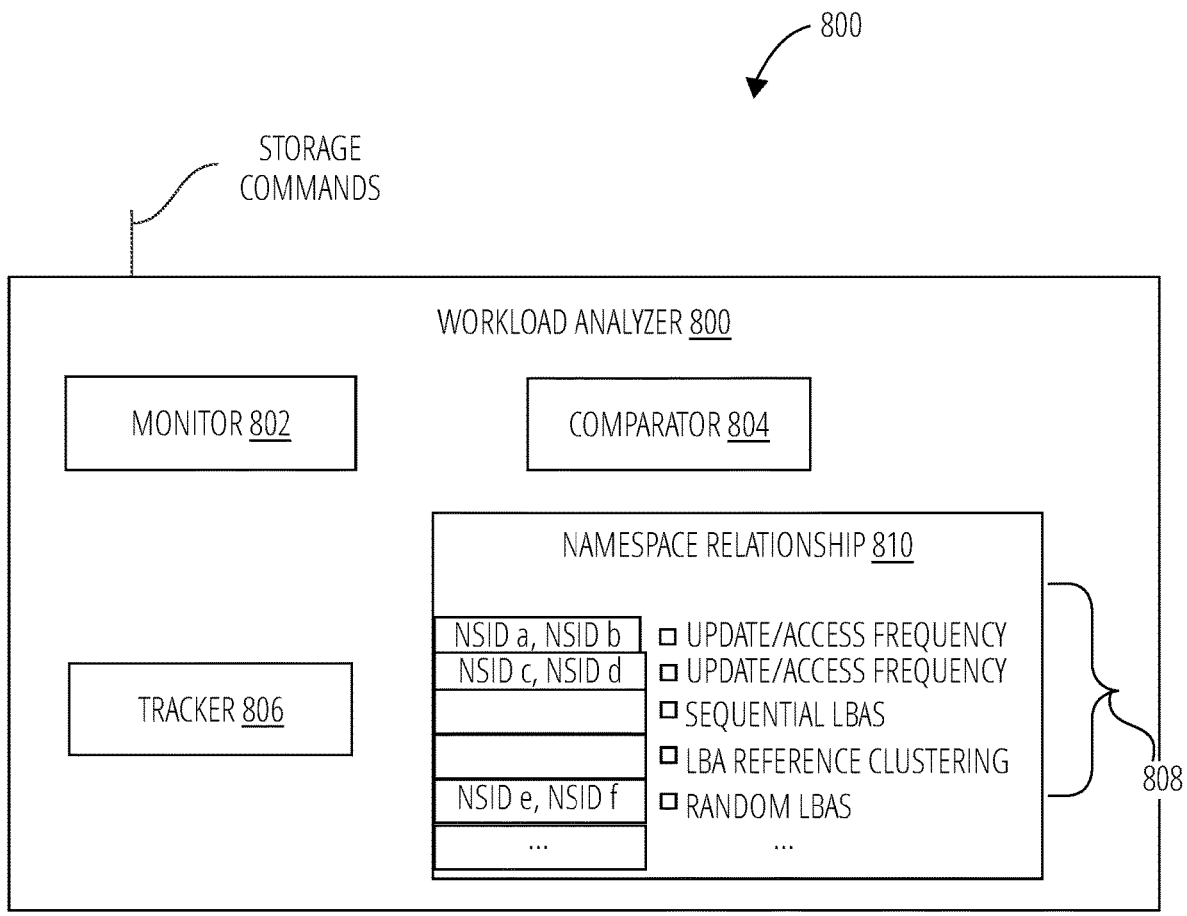
FIG. 8 illustrates a workload analyzer 800 in accordance with one embodiment.

FIG. 8 illustrates a workload analyzer 800 in detail in accordance to one embodiment. The workload analyzer 800 includes a monitor 802, a comparator 804, a tracker 806, a set of workload attributes 808, and a namespace relationship table 810. The monitor 802 coordinates with the write data pipeline 702 and read data pipeline 704 to identify, count, and track storage commands received, and serviced by, the storage controller 126. Specifically, in one embodiment, the monitor 802 monitors storage commands that reference one or more namespaces by identifying the namespace identifier used in each storage command.

In certain embodiments, the monitor 802 monitors all storage commands serviced by the storage controller 126.

In another embodiment, the monitor 802 monitors storage commands until a monitoring threshold is satisfied. The monitoring threshold may be a number that a device manufacturer has determined is a sufficient number of storage commands to review before an analysis is done to derive relationships between namespaces and their respective workload attributes. For example, the monitoring threshold may be one thousand storage commands. Alternatively, the monitoring threshold, may be set by a user-defined parameter and/or by a parameter provided by a storage client. In another embodiment, the monitoring threshold may be a time period that a device manufacturer has determined provides a sufficient number of storage commands to review before an analysis is done to derive relationships between namespaces and their respective workload attributes. For example, the monitoring threshold may be fifteen minutes.

Those of skill in the art will appreciate that the monitor 802 may monitor read commands, write commands, and maintenance commands. Provided the storage command includes an indicator of the namespace such as a namespace identifier, the monitor 802 may be able to determine a relationship between two or more namespaces based on the storage command. Of course, for certain workload attributes, one type of storage command may be more helpful in determining a relationship than another type. For example, read commands for two different namespaces at the same access frequency may be more indicative of a relationship based on the access frequency than write commands to the same two namespaces.

The tracker 806 keeps track of which namespaces the workload analyzer 800 has previously reviewed. Specifically, the tracker 806 may track a namespace identifier provided with each storage command to determine which namespaces are being referenced. In particular, the tracker 806 may track each namespace identifier associated with data stored in each of a set of open erase blocks, described in further detail below. In certain embodiments, the tracker 806 collaborates with the data allocator to maintain a table, or other data store, identifying which namespaces (using their namespace identifiers) have data in which open erase blocks. This table represents which namespaces have data in which open erase blocks, the table is described in more detail in relation to FIG. 9 and is identified in FIG. 9 as a correlation table 908.

The workload analyzer 800 includes a comparator 804 configured to review the information gathered by the tracker 806 and workload attributes and deduce, or determine, relationships between namespaces with stored data in currently open erase blocks based on the workload attributes detected for the workloads associated with those namespaces. The workload analyzer 800 tracks and distinguishes namespaces using their namespace identifiers. For example, in one embodiment, the comparator 804 determines that namespace a and namespace b have similar update frequencies or similar access frequencies. In this example, the access frequency for data associated with namespace a may be one thousand of the last ten-thousand storage commands and the access frequency for data associated with namespace b may be 1500 of the last ten-thousand storage commands. The comparator 804 includes logic that determines that these two workload attributes are close enough to derive a relationship or commonality between namespace a and namespace b. In one embodiment, this derived, or implied relationship, between these namespaces is a hint, or prediction, that an observed relationship, similarity, or commonality will continue to exist between the two namespaces such that placing data for both on the same open erase block will be advantageous for the non-volatile memory system 102.

Similarly, the comparator 804 may determine that namespace e and namespace f have similar random use of LBAs for the write commands and/or read commands. Based on these relationships, the comparator 804 may update a namespace relationship table 810 to reflect a workload attribute relationship between namespaces (e.g., namespace a and namespace b; namespace e and namespace f).

In one embodiment, the workload analyzer 800 includes a set of workload attributes 808 used to identify relationships between namespaces. FIG. 8 lists a few example workload attributes 808, including, but not limited to, update/access access frequency, whether or not the data accessed in the storage command is accessed according to sequential ascending, sequential descending, or randomly identified LBAs, LBA reference clustering, or other similar attributes. In some embodiments, the tracker 806 may rank these workload attributes based on which ones will be most in optimizing performance for specific applications.

In the depicted embodiment, the namespace relationship table 810 may include a listing of all the workload attributes 808 that the workload analyzer 800 tracks. The namespace relationship table 810 may include open slots for workload attributes 808 that do not yet have an identified relationship between other namespaces in the open erase blocks. The workload analyzer 800 collaborates with the data allocator 714 to review, revise, and update the namespace relationship table 810 as open erase blocks fill and are closed and free erase blocks are enlisted as open erase blocks.

In certain embodiments, in addition to determining a relationship between two or more namespaces and managing the relationship in the namespace relationship table 810, the comparator 804 may assign a confidence level to each relationship in the table. A confidence level is a rating that indicates how accurate the comparator 804 anticipates that the identified relationship is accurate. In one embodiment, the confidence level is a value ranging between 0 and 1 or 0 and 100 when presented as a percentage. In the example illustrated in FIG. 8, the confidence level for the namespace a and namespace b relationship may be 88% and the confidence level for the namespace e and namespace f relationship may be 55%. The namespace e and namespace f relationship may be 55% may be lower because deriving a relationship based on a behavior related to randomness may likely be less accurate.

In one embodiment, the workload analyzer 800 operates on storage commands as they are received, in real time. Alternatively, the workload analyzer 800 may log storage commands and analyze them later when doing so has a minimal impact on the non-volatile memory system's performance. In another embodiment, the workload analyzer 800 operates when the non-volatile memory device 118 is doing maintenance operations such as garbage collection.

In one embodiment, the workload analyzer 800 operates periodically or in response to a request from the storage controller 126 in order to review, revise, and update the relationships between namespaces. In one embodiment, the workload analyzer 800 may monitor additional storage commands and determine whether the recorded relationships still represent the current workloads associated with the related namespaces. In one embodiment, after monitoring additional storage commands the workload analyzer 800 may modify confidence levels (either up or down) as the additional monitoring supports or detracts from the previously defined relationship.

Figure 9:
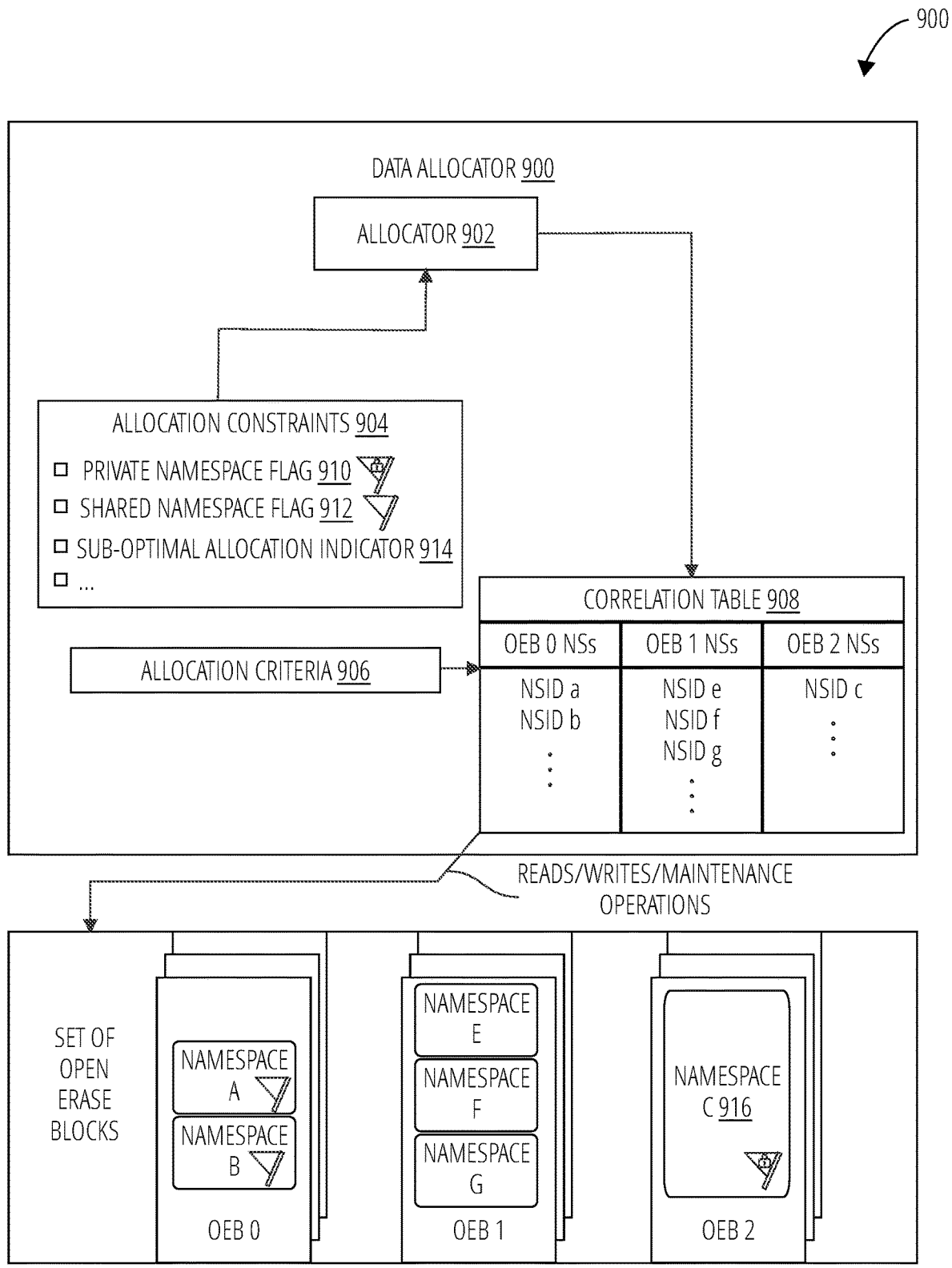
FIG. 9 illustrates a data allocator 714 in accordance with one embodiment.

FIG. 9 illustrates a data allocator 900 in accordance with one embodiment. The data allocator 900 comprises an allocator 902, allocation constraints 904, allocation criteria 906, and a correlation table 908. The data allocator 900 is configured to direct an open erase block manager (or other non-volatile memory media 120 physical placement manager) to group data of write commands having a first namespace identifier into a common one of two or more of the open logical erase blocks as write commands having a second namespace identifier, based on a relationship between the namespaces. In one embodiment, the relationship between the namespaces is an implied relationship.

The allocator 902 determines where write data will be allocated among the open erase blocks. In certain embodiments, the allocator 902 identifies the logical page where the data will be stored. The allocator 902 may collaborate with the comparator 804 to determine which open erase block to direct the write data to. The allocator 902 may track which namespaces (using the NSID) have data in each of the open erase blocks (OEB) using the correlation table 908.

In the example illustrated, OEB 0 lists NSID a and NSID b. OEB 1 lists NSID e and NSID f and NSID g. OEB 2 lists NSID c. As indicated by the workload analyzer 800, NSID a and NSID b have an update/access frequency relationship and have thus been stored in the same open erase block, OEB0. Similarly, NSID e and NSID f have random LBA accesses relationship and have thus been stored in the same open erase block, OEB1.

Typically, the data allocator 900 operates on write data as the write data is being sent to the storage device. The data allocator examines the write command, identifies the namespace, by its namespace identifier provided with the write command, and contacts the comparator 804 to determine if the namespace identifier has a relationship defined in the namespace relationship table 810. If so, the data allocator 900 seeks to direct the data of the write command to an open erase block that includes namespaces (e.g., namespace identifiers) that have the same relationship with the namespace (e.g., namespace identifier) of the write command. FIG. 9 illustrates an example of the allocator 902 grouping the data of namespace e, f, and g in the open erase block OEB1.

In certain embodiments, the allocator 902 determines which open erase block to use for write data based on certain allocation constraints 904 and/or allocation criteria 906.

An allocation constraints 904 is a constraint that limits where write data can be stored on the non-volatile memory media 120. An allocation constraint may be defined by an industry standard, by the device manufacturer, by logic of the storage controller 126, by a host using the storage device, or the like. In one embodiment, allocation constraints 904 are used to implement a standard such as the NVMe standard. In particular, an allocation constraint may be used to define endurance groups. Certain allocation constraints 904 must be followed to comply with a standard, other allocation constraints 904 may be optionally adhered to, even to qualify for the standard. Examples of allocation constraints 904 include, but are not limited to a private namespace flag, shared namespace flag, a quality of service, and the like.

Allocation constraints 904 may include parameters such as a private namespace flag 910 or shared namespace flag 912. Allocation constraints 904 may be included by a host with a write command or may be assigned due to the context of the write command (e.g., certain namespaces may be designated on a type that indicates a private namespace or a shared namespace. Data flagged for a private namespace, such as namespace C 916, may not share a namespace with data not flagged for the same private namespace. Data associated with different namespace identifiers may, in some embodiments, be grouped together, provided each namespace identified comprises a shared namespace flag 912, such as the data stored in the illustrated namespaces, namespace A and namespace B. In other embodiments, it may be required or preferred for such data to share a namespace, rather than simply permitted. Of course in certain embodiments, the ability for namespaces to share the same storage non-volatile memory media 120 may be the default behavior and a shared namespace flag may not be needed or designated.

As explained, the allocator 902 may collaborate with the comparator 804 to determine which open erase block to direct the write data to. However, the determination may be over-ridden or negated by an allocation constraint. For example, the comparator 804 has determined that namespace c and namespace d have an access frequency relationship, See FIG. 8. Normally, the comparator 804 would direct the allocator 902 to store data for namespace c and namespace d together in an open erase block. However, namespace c has a private namespace flag allocation constraint. Namespace d does not have a private namespace flag that matches the private namespace flag of namespace c and so the allocator 902 can not place data for namespace c on the same open erase block as namespace d.

In such an example, data for namespace d may be stored on another erase block, for example OEB 3 (not shown) may be opened after OEB1 is closed. In this example, namespace d was not stored in the open erase block that corresponded to a relationship with an existing namespace already stored (OEB2, namespace c) because of the allocation constraint. This situation is a sub-optimal allocation. In certain embodiments, the allocator 902 may mark data stored for namespace d in a separate erase block with a sub-optimal allocation indicator. Sub-optimal allocation indicators may be a type of allocation constraint and may be used by the storage controller 126 to more optimally group data blocks when the storage controller 126 performs maintenance operations such as garbage collection.

OEB 0 illustrates an example where the allocator 902 stores only data that has the same allocation constraint together in the same open erase block. In OEB0, the allocation constraint is the shared namespace flag.

In one embodiment, the determination of which open erase block to direct the write data to, by the allocator 902, may be revised or over-ridden based on one or more allocation criteria. As used herein, allocation criteria is any condition, optimization, parameter, constraint or requirement regarding how or where write data may be allocated among a set of open erase blocks. One example of an allocation criteria may be the health of the open erase block. In certain embodiments, the allocation criteria may obligate the allocator 902 to store new write data to the most healthy open erase block, even though the comparator 804 has identified a different open erase block for the data based on a workload attribute shared by data from the two namespaces. Another example allocation criteria may be a minimum allocation space requirement. For example, the minimum allocation space requirement may require that an open erase block that has not yet stored data for the namespace of the current write data and must at least two free logical pages available to accept write data before the open erase block is filled. This minimum allocation space requirement may be in place to prevent the allocator 902 from directing write data to a certain open erase block based on a commonality between namespaces only to have less than two logical pages of data stored on the open erase block. A minimum allocation space requirement may be implemented to ensure that the benefits of grouping write data based on derived or implied namespace relationships are realized. Less that than two logical pages of data may not be sufficient.

In another embodiment, the storage controller 126 may be configured to support the minimum allocation space requirement by reserving a threshold number of pages in the open erase block once write data for two namespaces having an implied relationship have been allocated to the same open erase block. In this manner, more write data from one or the other namespaces may also be stored on the same open erase block and thus leverage the performance advantage of grouping the write data based on a derived relationship between the namespaces.

Figure 10:
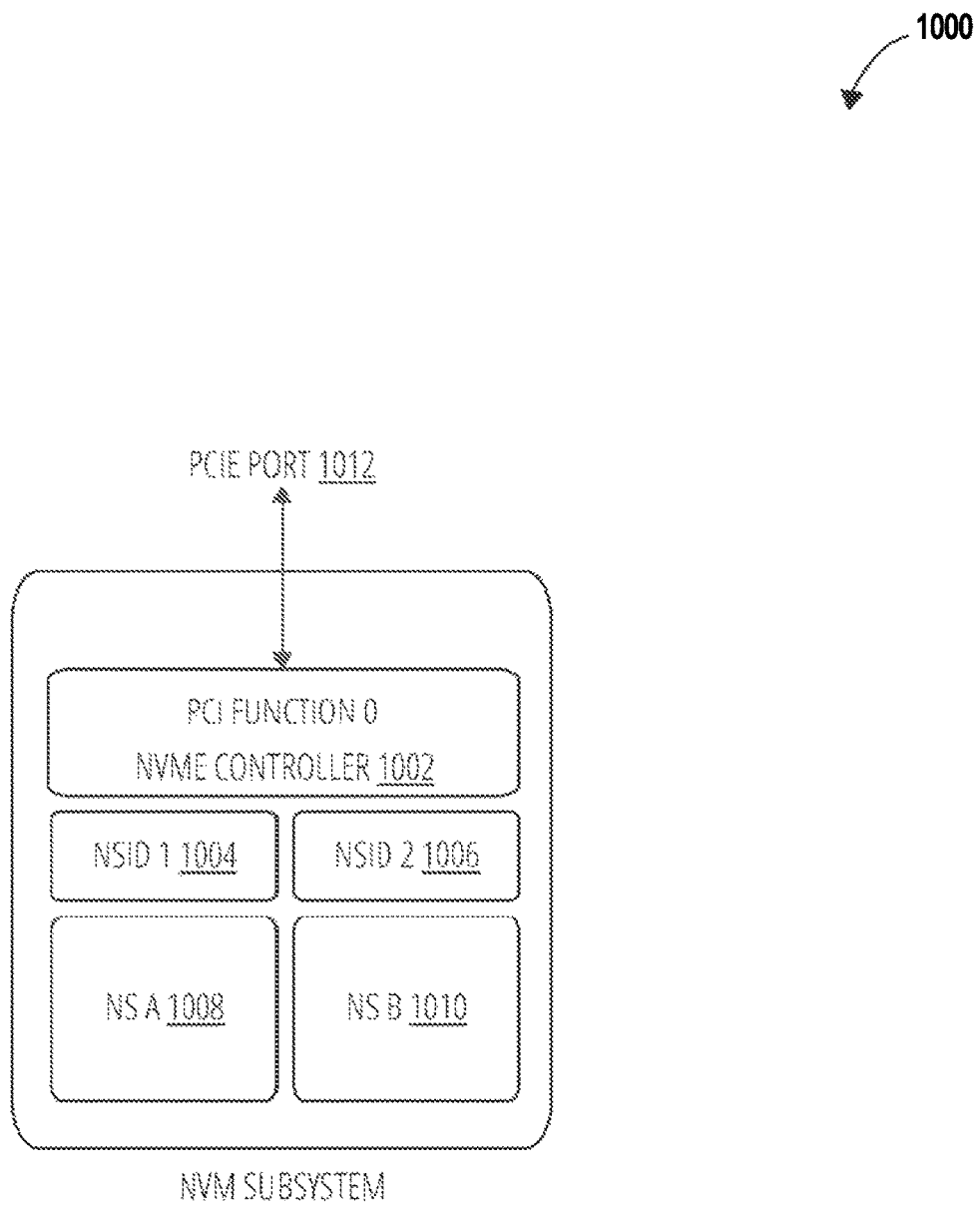
FIG. 10 illustrates an NVM subsystem 1000 in accordance with one embodiment.

FIG. 10 shows an NVM subsystem 1000 in accordance with one embodiment. The NVM subsystem 1000 contains a single NVMe controller 1002 and a single PCI Express port 1012. The controller in this figure supports two namespaces (namespace A 1008 and namespace B 1010) labeled NS A and NS B. Associated with each controller namespace is a namespace ID (namespace ID 1 1004 and namespace ID 2 1006, respectively) labeled as NSID 1 and NSID 2. Namespace ID 1 1004 and namespace ID 2 1006 are used by the controller to reference a specific namespace. In this example namespace ID 1 1004 is associated with namespace A 1008 and namespace ID 2 1006 is associated with namespace B 1010.

The namespace ID is used by the Host in order to have a logical partitioning of the device. One or more namespaces may be used by one application A while other namespaces may be used by application B.

When opening memory blocks to store data, conventional non-volatile memory systems open a memory block from a free block list within the memory system that is associated with a lowest program/erase cycle count. When getting more data, it is associated with the open blocks in the system while considering the temperature of the data.

In previous non-volatile memory systems, prior to storing data, a memory management module at a non-volatile memory system examines the data to determine whether the data is frequently updated or infrequently updated. This characteristic of the data is also known as the access-frequency "temperature" of the data—were "hot data" refers to data that is frequently updated, versus "cold data"—which is a term that represents data that is not frequently updated. After determining how frequently the data is updated, the memory management module writes the data to the relevant open block—separating hold and cold data. Another parameter that may be consider is the sequential LBA addressing of the data. However, neither the namespace ID nor the logical unit number is considered while making this decision.

Figure 11:
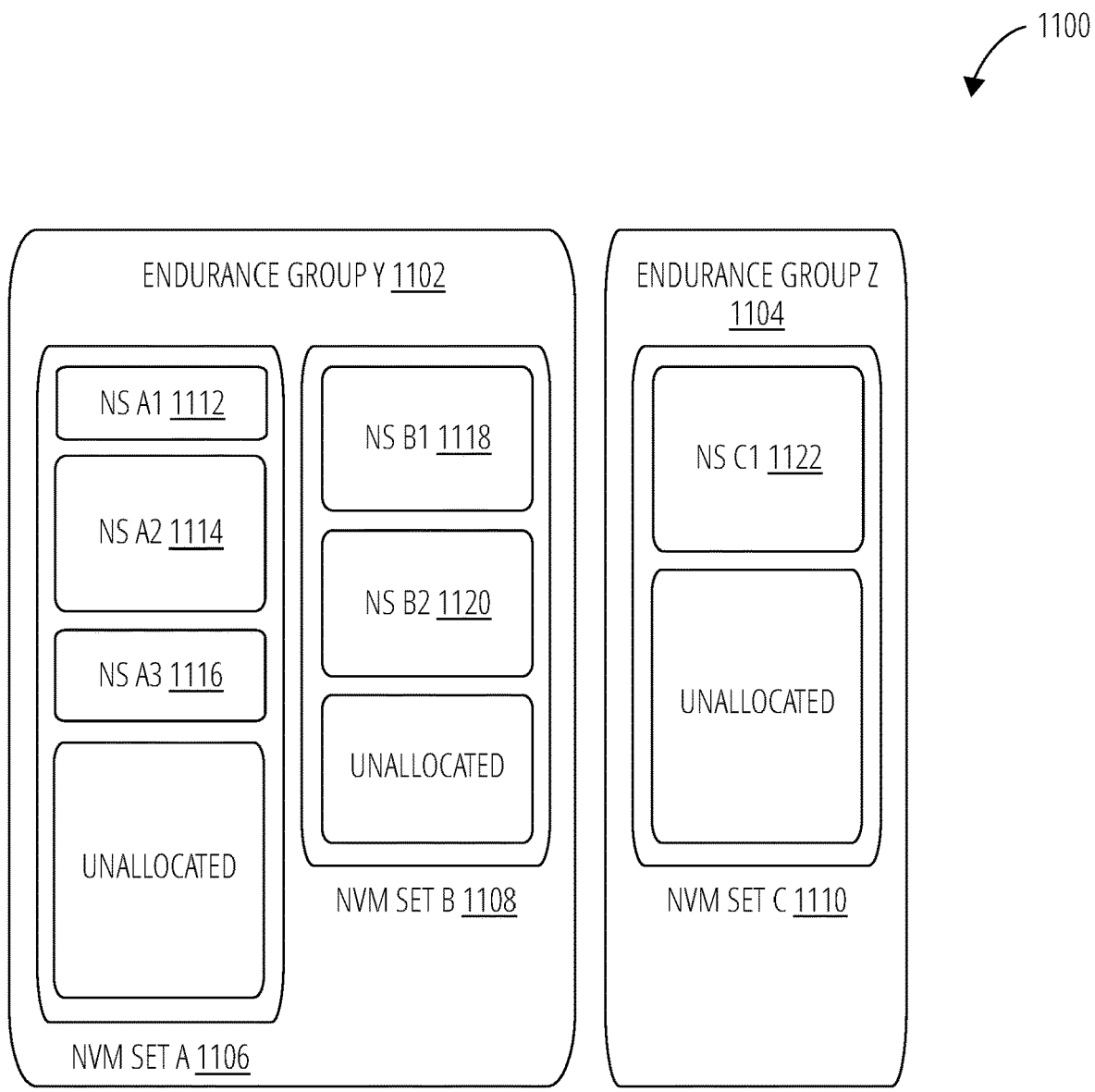
FIG. 11 illustrates an NVMe endurance group 1100 in accordance with one embodiment.

FIG. 11 illustrates an NVMe endurance group 1100 in accordance with one embodiment. The next version of NVMe standard (version 1.4) introduces the NVMe endurance group feature as illustrated in FIG. 11. In this example, NVM set A 1106 contains NS A1 1112, NS A2 1114, and NS A3 1116, in addition to unallocated space. NVM set B 1108 contains NS B1 1118, NS B2 1120, and unallocated space. NVM set C 1110 contains NS C1 1122 and unallocated space.

In this example, the endurance of NVM set A 1106 and NVM set B 1108 are managed together as part of endurance group Y 1102, while the endurance of NVM set C 1110 is managed only within NVM set C 1110 as it is the only NVM Set that is part of endurance group Z 1104. This feature enforces the storage device to implement dedicated open blocks for each endurance group.

However, the 'Endurance-Groups' option is an optional feature that is targeted to enterprise and entry level applications solely. Furthermore, within a particular endurance group, storage devices that implement the claimed solution may leverage the namespace ID to group write data on storage devices that support NVMe endurance groups.

Figure 12:
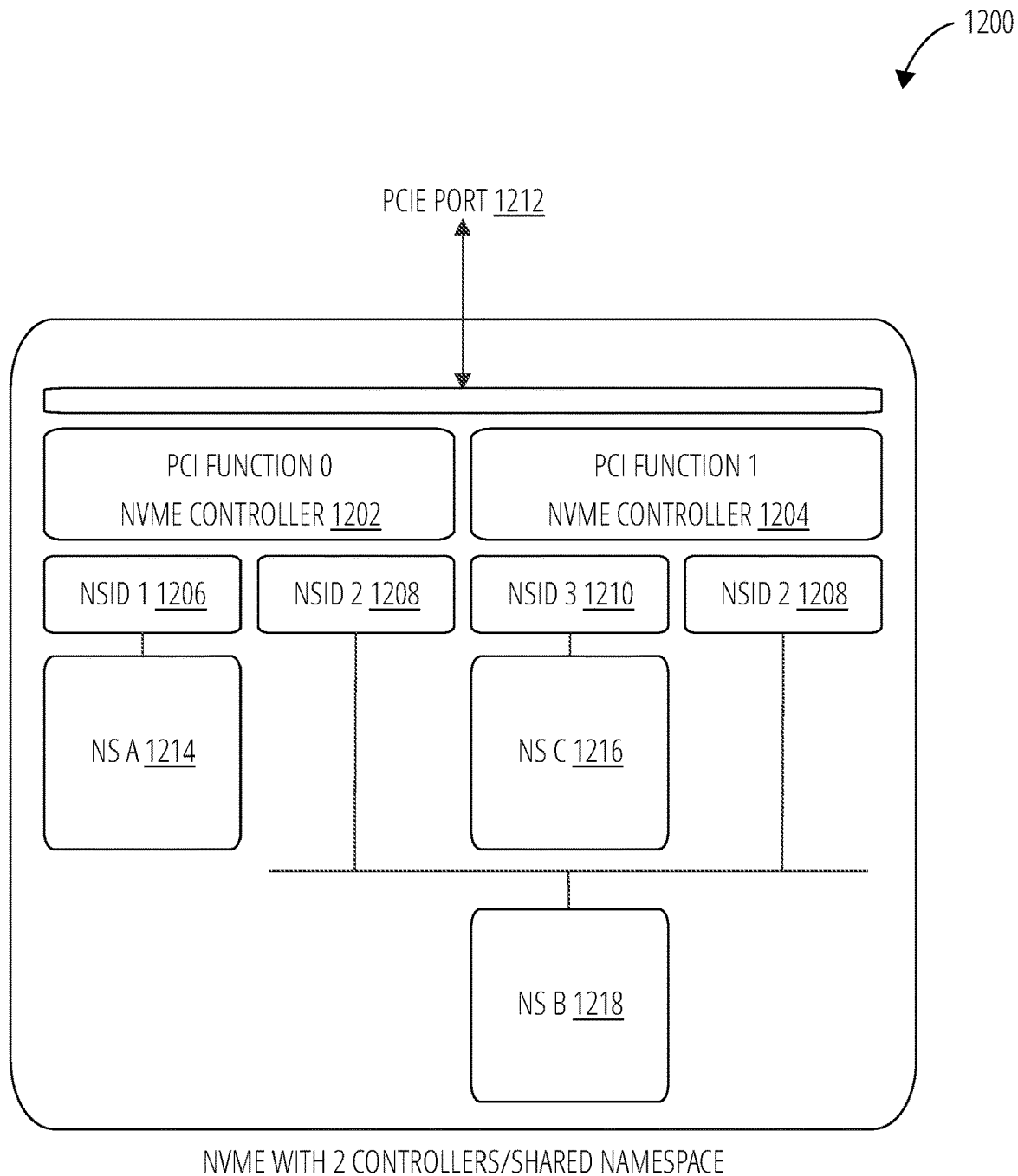
FIG. 12 illustrates an NVMe with two controllers and shared namespace 1200 in accordance with one embodiment.

FIG. 12 shows an NVMe with two controllers and shared namespace 1200 in accordance with one embodiment. In one embodiment, the maximum number of open blocks supported by the storage device is equal to the maximum number of supported namespace IDs. In this implementation, each open block may be assigned to a dedicated namespace ID uniquely. In another embodiment, a storage device may refer to a private and shared namespace differently. For instance, private namespaces do not share the same open block while shared namespaces may share the same open blocks.

In an additional embodiment, the temperature of a namespace is determined. If the namespace is accessed frequently by the Host, the namespace is classified as a hot namespace. Otherwise, the namespace would be classified as cold namespace. This classification could be used when assigning a namespace with an open block. In general, embodiments of the claimed solution would allow hot namespaces to share the same block while minimizing the mixture of hot and cold namespaces in a specific open block.

Another embodiment may be more related to automotive applications when shared namespaces are used. In one embodiment, a shared namespace is a namespace that may be attached to two or more controllers in an NVM subsystem concurrently. A host may determine whether a namespace is a private namespace or may be a shared namespace by the value of the Namespace Multi-path I/O and Namespace Sharing Capabilities field in the Identify Namespace data structure.

FIG. 12 shows a multi-Function NVM Subsystem with a single PCI Express port 1212 containing two controllers, NVMe controller 1202 and NVMe controller 1204. NVMe controller 1202 is associated with PCI Function 0 and NVMe controller 1204 is associated with PCI Function 1. Each controller supports a single private namespace (namespace A 1214 and namespace C 1216, respectively) and access to shared namespace B 1218. The namespace ID shall be the same in all controllers that have access to a particular shared namespace. In this example both controllers use namespace ID 2 1208 to access shared namespace B. Namespace ID 1 1206 is used to access private namespace A 1214, and namespace ID 3 1210 is used to access namespace C 1216.

In the illustrated system embodiment, the open blocks may be allocated write data based on namespace ID only, namespace ID+Host ID or namespace ID+workload evaluation metadata. This will lead to less TRIM or de-fragmentation operations. In addition, this may be expressed in more efficient garbage collection operations.

Figure 13:
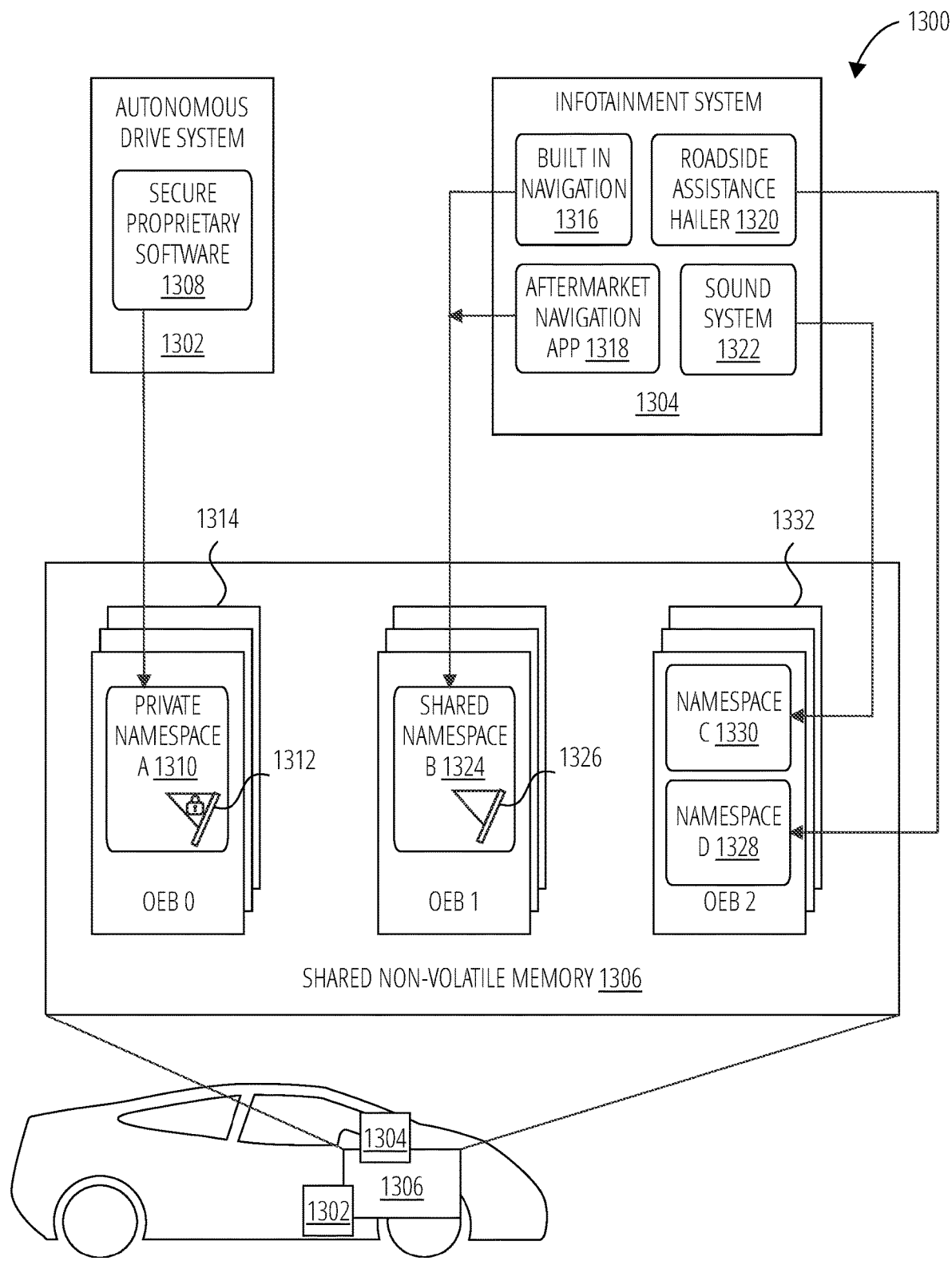
FIG. 13 illustrates an exemplary embodiment 1300 in accordance with one embodiment.

FIG. 13 illustrates an exemplary embodiment 1300 of the solution disclosed herein. One application for the disclosed method, system, and apparatus, is as part of a self-driving vehicle electronic system. Such a system may include an autonomous drive system 1302, an infotainment system 1304, and a shared non-volatile memory 1306.

The autonomous drive system 1302 may rely on a controller programed with secure proprietary software 1308, which may access certain secure protocols stored in private namespace A 1310. Write commands for data in private namespace A 1310 may include a private namespace flag 1312, indicating that the data allocated to this namespace may not share that namespace with any other data. Additional allocation constraints may indicated that this data must be stored in its own separate erase block 1314, such that no other host controllers or applications may access it. This precaution may be crucial to preserving the safety and integrity of autonomous driving capabilities.

The infotainment system 1304 may include navigation apps, both as built in navigation 1316 and an aftermarket navigation app 1318, a roadside assistance hailer 1320, a sound system 1322 controller, other media controllers, such as video controls, synching capabilities with mobile devices, and other user applications. Each application may store or access data in a dedicated namespace, or may share a namespace. For example, built in navigation 1316 and an aftermarket navigation app 1318 may both access a map database stored in shared namespace B 1324, which may be associated with a shared namespace flag 1326. The roadside assistance hailer 1320 and sound system 1322 may utilize namespace D 1328 and namespace C 1330 respectively. These two namespaces may both reside on a common open erase block 1332.

Figure 14:
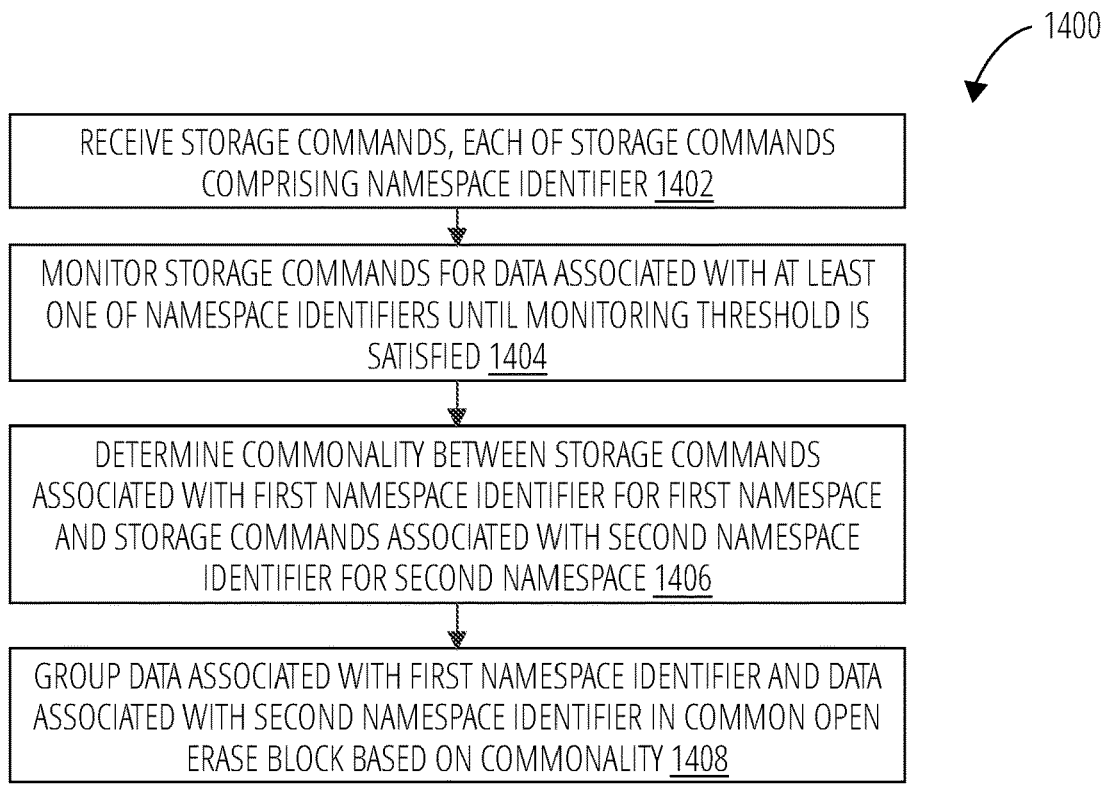
FIG. 14 illustrates a method 1400 in accordance with one embodiment.

FIG. 14 illustrates a method 1400 in accordance with one embodiment. In step 1402, method 1400 receives storage commands, each of the storage commands comprising a namespace identifier. In step 1404, method 1400 monitors the storage commands for data associated with at least one of the namespace identifiers until a monitoring threshold is satisfied.

In step 1406, method 1400 determines a commonality between the storage commands associated with a first namespace identifier for a first namespace and the storage commands associated with a second namespace identifier for a second namespace. In step 1408, method 1400 groups data associated with the first namespace identifier and data associated with the second namespace identifier in a common open erase block based on the commonality.

Figure 15:
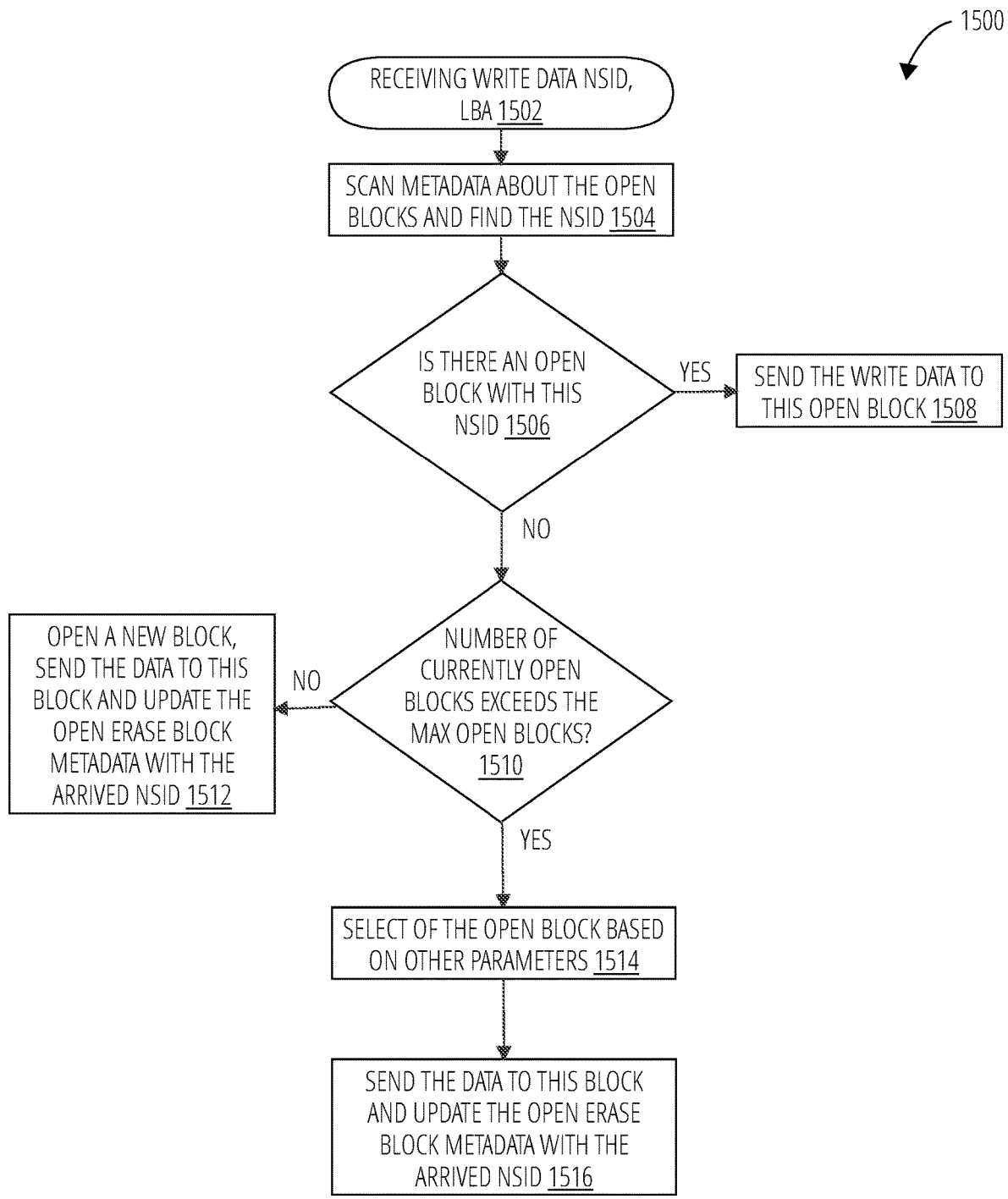
FIG. 15 illustrates a method 1500 in accordance with one embodiment.

FIG. 15 illustrates a method 1500 in accordance with one embodiment. It depicts an example of one method that may be used for the namespace-oriented open block management. The flow starts at start 1502 by receiving write data associated with specific NSID and LBA. Next, at step 1504, storage device scans the contexts of the open blocks in order to find whether this NSID was already used by one of the open blocks (decision step 1506). If it was used, the data is sent to the open block that already has this NSID (step 1508).

If there are no open blocks using this NSID, at decision step 1510 the storage device determines whether the number of currently open blocks has reached the limit for the maximum number of open blocks. If not, the storage device will open a new block (step 1512), write the data and update a correlation table 908 with the arrival NSID. If it is impossible to open a new block, at step 1514 the data will be sent to one of the already open blocks while updating the correlation table 908 accordingly (step 1516).

The selection may also be based on other parameters. For example, the open block that contains the minimum number of namespace IDs may be used. The oldest open block (highest program erase count) may be used. The open block that contains the maximum amount of data may be used. Other criteria may be considered such as temperature and sequential LBA addressing of data.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed.

What is claimed is:

1. An apparatus, comprising:
   a non-volatile memory comprising a plurality of erase blocks; and
   a storage controller coupled to the non-volatile memory, the controller configured to:
      receive a first set of storage commands for a first namespace and is receive a second set of storage commands for a second namespace;
      determine a first namespace relationship between the first namespace and the second namespace, wherein the first namespace relationship is determined from first workload attributes of the first set of storage commands received for the first namespace and second workload attributes of the second set of storage commands received for the second namespace, wherein workload attributes comprises:
         an access frequency,
         a number of read commands received over a time period,
         a number of write commands received over a time period,
         a ratio of a number of received read commands to a number of received write commands,
         a number of errors found in data associated with the received read commands,
         a number of correctable errors found in the data associated with the received read commands,
         a number of write commands succeeded, and
         a number of write commands failed, wherein the first workload attributes comprise at least one of the workload attributes, and wherein the second workload attributes are the same as the first workload attributes;
      decide, based on determining that the first namespace relationship exists, to store the first set of storage commands and the second set of storage commands together in a first erase block; and
      store the first set of storage commands for the first namespace and the second set of storage commands for the second namespace in the first erase block based on the first namespace relationship.

2. The apparatus of claim 1, wherein the determining comprises:
tracking a first namespace identifier for the first namespace and a second namespace identifier for the second namespace; and
determining that the second namespace identifier matches the first namespace identifier.

3. The apparatus of claim 1, wherein the storage controller is further configured to:
monitor whether the first set of storage commands and the second set of storage commands satisfies a threshold value, wherein the threshold value is a number of storage commands received to determine the first namespace relationship; and
compare the first workload attributes of the first namespace and the second workload attributes of the second namespace based on storage commands monitored.

4. The apparatus of claim 1, wherein the storage controller is further configured to:
receive a third set of storage commands for a third namespace, wherein the third namespace comprises third workload attributes, and wherein the third workload attributes matches the first namespace relationship;
determine that the third namespace has a second allocation constraint, wherein the first namespace and the second namespace has a first allocation constraint;
program the third set of storage commands to a second erase block of the non-volatile memory; and
store the third set of storage commands of the third namespace in a second erase block that does not store the first set of storage commands of the first namespace and second set of storage commands of the second namespace in response to the first allocation constraint associated with the first namespace differing from the second allocation constraint of the second namespace.

5. The apparatus of claim 4, wherein an allocation constraint comprises either a private namespace flag or a shared namespace flag, and wherein the second allocation constraint is different from the first allocation constraint.

6. The apparatus of claim 5, wherein the the storage controller is configured to only store the first set of storage commands and the second set of storage commands data associated with the first allocation constraint in the first erase block and the third set of storage commands associated with the second allocation constraint in the second erase block.

7. The apparatus of claim 4, wherein the storage controller is further configured to:
mark the third set of storage commands of the third namespace in the second erase block with a sub-optimal allocation indicator; and
use the sub-optimal allocation indicator for subsequent maintenance operations.

8. The apparatus of claim 6, wherein the storage controller is further configured to select the first erase block and the second erase block from a plurality of open erase blocks based on the allocation constraint.

9. The apparatus of claim 1, wherein a threshold number of pages is reserved in the first erase block for subsequent one or more newly received set of storage commands associated with at least one of the first namespace or second namespace.

10. The apparatus of claim 1, wherein the first namespace relationship between the first namespace and the second namespace is revised based on at least one of a first one or more additional received storage commands of the first namespace or a second one or more additional received storage commands of the second namespace, and wherein the at least one of a first one or more additional received storage commands of the first namespace or a second one or more additional received storage commands of the second namespace are monitored after the first namespace relationship is defined.

11. The apparatus of claim 10, wherein a confidence level is updated for to the first namespace relationship, wherein the updated confidence level is modified based on at least one of a first one or more additional received storage commands of the first namespace or a second one or more additional received storage commands of the second namespace, and wherein the first namespace relationship comprises an implied relationship based on the first workload attributes of the first namespace and the second workload attributes of the second namespace.

12. A system, comprising:
a non-volatile memory array comprising a plurality of dies, wherein each die of the plurality of dies comprises a plurality of physical erase blocks, wherein each physical erase block of the plurality of erase blocks is associated with a logical erase block; and
a storage controller coupled to the non-volatile memory array, the storage controller configured to:
receive write commands from a plurality of hosts, each of the write commands comprising a namespace identifier;
determine that a first namespace relationship between a first namespace for a first host and a second namespace for a second host based on first workload attributes for first write commands from the first host and on second workload attributes for second write commands from the second host, wherein workload attributes comprises:
an access frequency,
a number of read commands received over a time period,
a number of write commands received over a time period,
a ratio of a number of received read commands to a number of received write commands,
a number of errors found in data associated with the received read commands,
a number of correctable errors found in the data associated with the received read commands,
a number of write commands succeeded, and
a number of write commands failed, wherein the first workload attributes comprise at least one of the workload attributes, and wherein the second workload attributes are the same as the first workload attributes;
maintain two or more logical erase blocks for receiving write data;
decide, based on determining that the first namespace relationship exists, to group the first write commands and the second write commands together in a first two or more open logical erase blocks; and
group first data of the first write commands having a first namespace identifier and second data of the second write commands having a second namespace identifier into the first two or more open logical erase blocks.

13. The system of claim 12, wherein the grouping comprises tracking a namespace identifier for each namespace, and wherein the second namespace identifier matches the first namespace identifier.

14. The system of claim 12, wherein the determining comprises:
monitoring a number of storage commands received;
determining if the number of storage commands received satisfies a threshold;
comparing, if the number of storage commands received satisfied the threshold, the first workload attributes of the first namespace and the second workload attributes of the second namespace; and
determining that the first workload attributes matches the second workload attributes.

15. The system of claim 12, wherein the first namespace and the second namespace have one or more first allocation constraints and a third namespace has one or more second allocation constraints, and wherein third data of third write commands of the third namespace is stored in a second two or more open logical erase blocks that does not store the first data of the first namespace and the second data of the second namespace in response to the one or more second allocation constraints not matching the one or more first allocation constraints.

16. The system of claim 12, wherein the workload attributes further comprises an update frequency, a sequential set of logical block addresses, a clustering of logical block addresses, and a random set of logical block addresses.

17. The system of claim 15, wherein:
the one or more first allocation constraints comprises a shared namespace flag;
the one or more second allocation constraints comprises a private namespace flag;
the first two or more open logical erase blocks comprises the first data and the second data with the shared namespace flag; and
the second two or more open logical erase blocks comprises the third data with a private namespace flag.

18. A method, comprising:
receiving, by a controller, storage commands, each of the storage commands comprising a namespace identifier;
monitoring, by the controller, the storage commands associated with at least one of the namespace identifiers until a monitoring threshold is satisfied;
determining, by the controller, a first namespace relationship between the storage commands associated with a first namespace identifier of a first namespace and the storage commands associated with a second namespace identifier of a second namespace, wherein workload attributes comprises:
an access frequency,
a number of read commands received over a time period,
a number of write commands received over a time period,
a ratio of a number of received read commands to a number of received write commands,
a number of errors found in data associated with the received read commands,
a number of correctable errors found in the data associated with the received read commands,
a number of write commands succeeded, and
a number of write commands failed, wherein the first workload attributes comprise at least one of the workload attributes, and wherein the second workload attributes are the same as the first workload attributes;
deciding, based on determining that the first namespace relationship exists, to group first write data associated with the first namespace identifier and second write data associated with the second namespace identifier together in a first erase block; and
grouping, by the controller, the first write data and second write data in the first open erase block based on the commonality.

19. The method of claim 18, wherein a namespace relationship comprises an attribute selected from a group comprising an update frequency, an access frequency, a sequential set of logical block addresses, a clustering of logical block addresses, and a random set of logical block addresses.

20. The method of claim 18, wherein grouping write data comprises grouping first write data associated with the first namespace identifier and second write data associated with the second namespace identifier in response to the first namespace and the second namespace comprising a common allocation constraint, and wherein the common allocation constraint is either a shared namespace flag or a private namespace flag.

* * * * *